Sept. 28, 1965 H. G. JENSEN 3,208,572

MULTIPLE PRICING UNIT

Filed July 30, 1963 6 Sheets-Sheet 1

INVENTOR.
HERMAN G. JENSEN
BY Carl S. Lloyd
ATT'Y.

INVENTOR.
HERMAN G. JENSEN
BY Carl S. Lloyd
Atty.

Sept. 28, 1965 H. G. JENSEN 3,208,572

MULTIPLE PRICING UNIT

Filed July 30, 1963 6 Sheets-Sheet 3

INVENTOR.
HERMAN G. JENSEN
BY Carl S. Lloyd
Atty.

Sept. 28, 1965 H. G. JENSEN 3,208,572

MULTIPLE PRICING UNIT

Filed July 30, 1963 6 Sheets-Sheet 4

INVENTOR
HERMAN G. JENSEN
BY Carl S. Lloyd
Att'y.

Sept. 28, 1965 H. G. JENSEN 3,208,572

MULTIPLE PRICING UNIT

Filed July 30, 1963 6 Sheets-Sheet 5

INVENTOR.
HERMAN. G. JENSEN
BY [signature]
Att'y.

INVENTOR.
HERMAN G. JENSEN
BY Carl S. Lloyd
Atty.

United States Patent Office 3,208,572
Patented Sept. 28, 1965

3,208,572
MULTIPLE PRICING UNIT

Herman G. Jensen, Chicago, Ill., assignor to The Seeburg Corporation, Chicago, Ill.

Filed July 30, 1963, Ser. No. 298,681
20 Claims. (Cl. 194—1)

This invention relates to a multiple pricing unit and more particularly to such a unit adapted for signaling credit values in coin-responsive equipment such as vending equipment which is operated by the deposit of coins in order to dispense merchandise or services.

In the embodiment disclosed herein, the invention is described with reference to a coin-operated phonograph installation which vends musical selections in response to the deposit of coins therein. The particular coin-operated phonograph installation described herein takes the form of a main phonograph unit and of several (e.g., one to twelve) remote phonograph units, which, as in a restaurant installation, would be located at the several restaurant booths. The main phonograph unit stores and plays the records upon selection, while the relatively smaller remote phonograph units are utilized to select and play a record by appropriate audio transmission from the main phonograph unit to the remote phonograph units.

In the past, phonograph installations of the general type described herein have been based upon a conventional single play record, for example, either a 78 or a 45 r.p.m. record consisting of one selection per side. A user could select one or more sides of such a record, and usually a discount premium has been attached to multiple selections (e.g., a single play for a nickel, three plays for a dime). However, if it were desired to alter this pricing sequence (e.g., all single plays at five cents each, or a single play for a dime, three plays for a quarter, etc.), it became necessary to replace parts or to rewire the phonograph units with each desired change in the pricing sequence.

Moreover, the most recent developments in the coin-operated phonograph industry have been predicated upon the introduction of stereophonic and of long-playing or album selections, such as 33⅓ r.p.m. records, which may contain several selections per side or even a long-playing continuous selection on a side of the record. Thus, the customer is in effect offered two different types of selections. The need for a simple and reliable system for establishing multiple pricing has been compounded by the introduction of album play in addition to the conventional single play, since it may be desired to alter the pricing ratio of an album play relative to a single play in addition to alterations in the pricing ratio of several single plays relative to an individual single play. Also, the need for space saving components in remote phonograph units has been accentuated by the desire to provide dual speakers (for stereophonic sound) in the remote phonograph unit itself. Of course, the remote phonograph unit must be as small as possible consistent with its function, in view of its usual location, such as in a restaurant booth or on a wall.

This invention provides a compact multiple pricing unit which is characterized by a high degree of flexibility in the establishment of a wide variety of pricing sequences, both for conventional single play phonograph installations and for combined single and album play phonograph installations and both for United States and for foreign currency environments. In the embodiment disclosed herein, the invention takes the form of a multiple pricing unit which is a component of a remote phonograph unit in which coins may be deposited and either a single or an album record may be selected for play over a dual channel two-speaker system. The unit is described as comprising a stacked credit wheel assembly which takes the form of three interconnected ratchet wheels. A first or nickel ratchet wheel is provided with equally spaced ratchet teeth, and the second or dime and the third or quarter ratchet wheels are each provided with sets of variably spaced ratchet teeth. Means are provided for detachably interconnecting the three ratchet wheels by simple manual actuation in order to provide for varying degrees of established credit for deposited dimes and quarters, as compared to a reference credit value established by rotation of the nickel ratchet wheel by an amount corresponding to a one tooth angular increment of rotation. Solenoid actuated pawl means cooperate with the interconnected ratchet wheels so that a deposited nickel may effect the one tooth angular increment of rotation for the interconnected ratchet wheels (which increment corresponds to the reference credit value), a deposited dime may effect an increment of rotation corresponding to either two, three, or four reference credit values, as desired, and a deposited quarter may effect an increment of rotation corresponding to either three, four, five, or six reference credit values, as desired. Alternatively, the unit may be calibrated by utilization of a coin switch and of a single credit electrical jumper for the use of dimes and quarters only so that a deposited dime may effect an increment of rotation corresponding to one reference credit value, while a deposited quarter may effect an increment of rotation corresponding to either three, four, five, or six reference credit values, as desired.

Electrical contactor means are provided to rotate correspondingly to the rotation of the interconnected ratchet wheels, and credit signals are thereby established for transmission to the main phonograph unit for appropriate selection of either a single or an album play. The unit is also calibrated by utilization of the single credit jumper and of certain album credit contact pins so that either one or two reference credit values may establish a single play selection circuit via appropriate credit signal means and so that ether four, five, six, eight, ten, or twelve reference credit values may establish an album play selection circuit via the credit signal means. Credit subtract means are also provided in the unit to erase the established credit after the indicated selection. Finally, the credit signal means are provided with an anti-cheating relay switch arrangement in order to prevent selection of an album play when only single play credit is established in the multiple pricing unit.

Accordingly, it is an object of this invention to provide a multiple pricing unit for signaling selectively variable credit values in coin-operated vending equipment.

It is a more specific object of the invention to provide such a unit for use in a coin-operated phonograph installation such that deposited coins may be correlated to credit values in accordance with selectively predetermined pricing sequences.

It is a related object of the invention to provide a multiple pricing unit for use in a coin-operated phonograph installation which is adapted for album and for single selection play and which is provided with anti-cheating means for differentiating between album and single selection established credit values.

It is still another object of the invention to provide a compact and reliable multiple pricing unit which is adapted for use in a remote unit of a coin-operated phonograph installation.

These and other objects, advantages, and features of the subject invention will hereinafter appear, and, for purposes of illustration, but not of limitation, an exemplary embodiment of the subject invention is shown in the appended drawings, in which.

Figure 1:
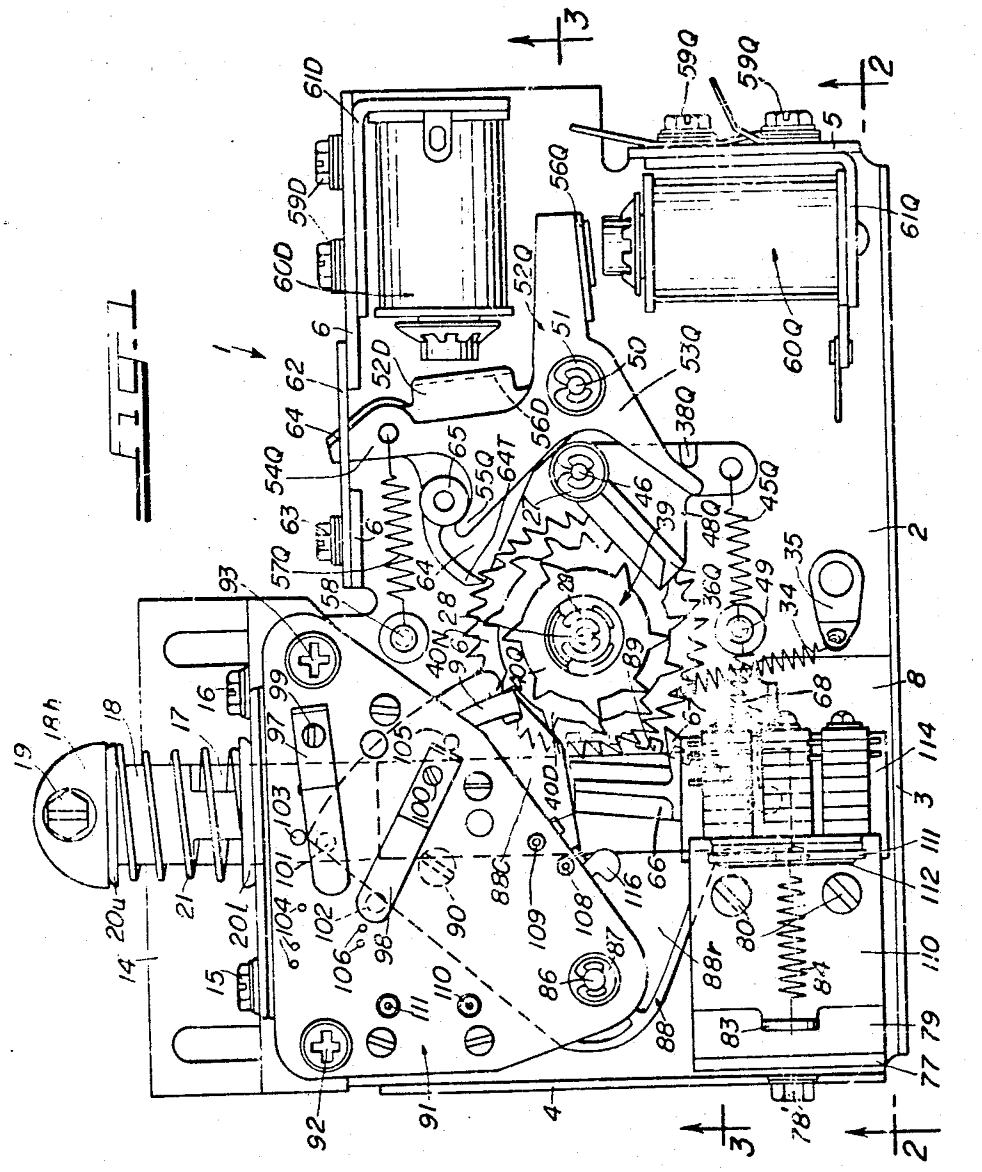
FIGURE 1 is a front elevational view of a multiple pricing unit produced in accordance with the subject invention.

With reference to the drawings, the numeral 1 generally designates a multiple pricing unit produced in accordance with the subject invention. The unit 1 comprises a back frame 2 having a bottom flange 3, a left flange 4, a right flange 5, a bifurcated right top flange 6, and a left top flange 7 all extending prependicularly upwardly from the back frame 2. An opening 8 is provided in the back frame 2 adjacent the bottom flange 3, and portions of the back frame 2 are inturned into the opening 8 parallelly with the bottom flange 3 to define the inturned flanges 10 and 12. These flanges are provided with slots 11 and 13 respectively (see FIGURE 2) in order to support a credit cancel slide 17, hereinafter described.

Figures 4, 5, 6:
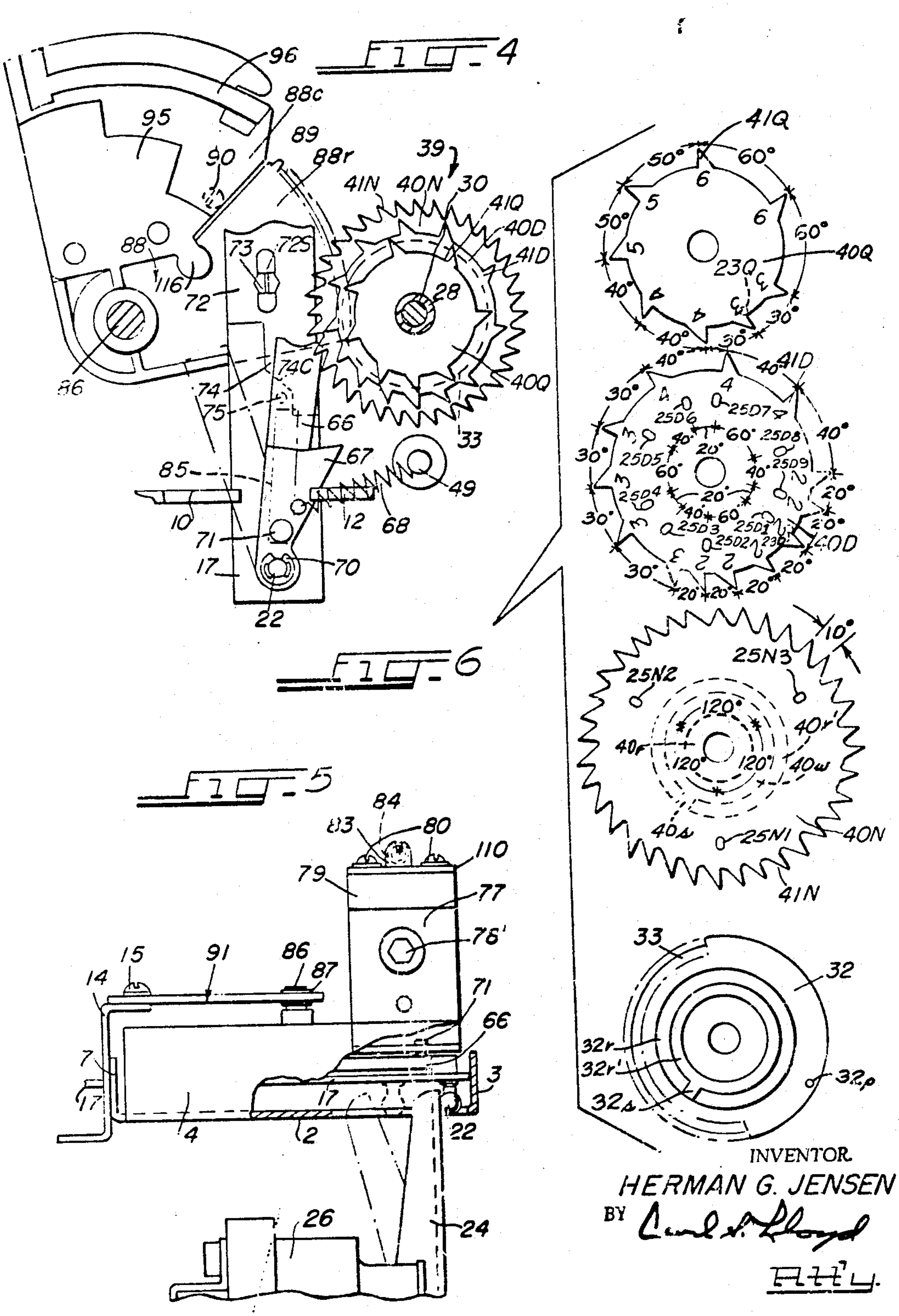
FIGURE 4 is a fragmentary sectional view taken along the line 4—4 of FIGURE 3.
FIGURE 5 is a partially broken away side elevational view, taken along the line 5—5 of FIGURE 2, and showing means for reciprocating a credit cancel slide, hereinafter described.
FIGURE 6 is an exploded plan view of a stacked credit wheel assembly contained in the multiple pricing unit.

A Z-shaped plate 14 is secured to the left top flange 7 by the bolts 15 and 16. Openings are provided in the plate 14 and in the flange 7 (not shown in the drawings) so that a credit cancel slide 17 may pass therethrough, as indicated in FIGURES 1 and 5. The credit cancel slide 17 comprises an elongated bar, the lower portion of which is received in the previously described slots 11, 13, of the flanges 10, 12 respectively. An I-shaped bar 18 (FIGURE 1) is secured to the slide 17 by means of a bolt 19 passing through a semi-circular head portion 18*h* of the bar 18 and through the slide 17. Upper and lower cup washer 20*u* and 20*l* respectively are provided with elongated slots therein (not shown) so that the slide 17 may pass therethrough. A helical spring 21 is contained between the cup washers 20*u* and 20*l* so that the credit cancel slide 17 is normally biased upwardly (relative to its FIGURE 1 disposition).

A knob shaft 22 is fixedly mounted on the lower end of the slide 17, and a slide actuating lever 24 (see FIGURE 5) is disposed adjacent an extremity of the knob shaft 22. A drive motor assembly 26 is provided to reciprocate the lever 24 one stroke for each record selection, as hereinafter described, so that the credit cancel slide 17 may correspondingly reciprocate from the position shown in FIGURE 1, to an expanded upward position under the influence of the spring 21, and back to the position shown in FIGURE 1.

Figures 2, 3:
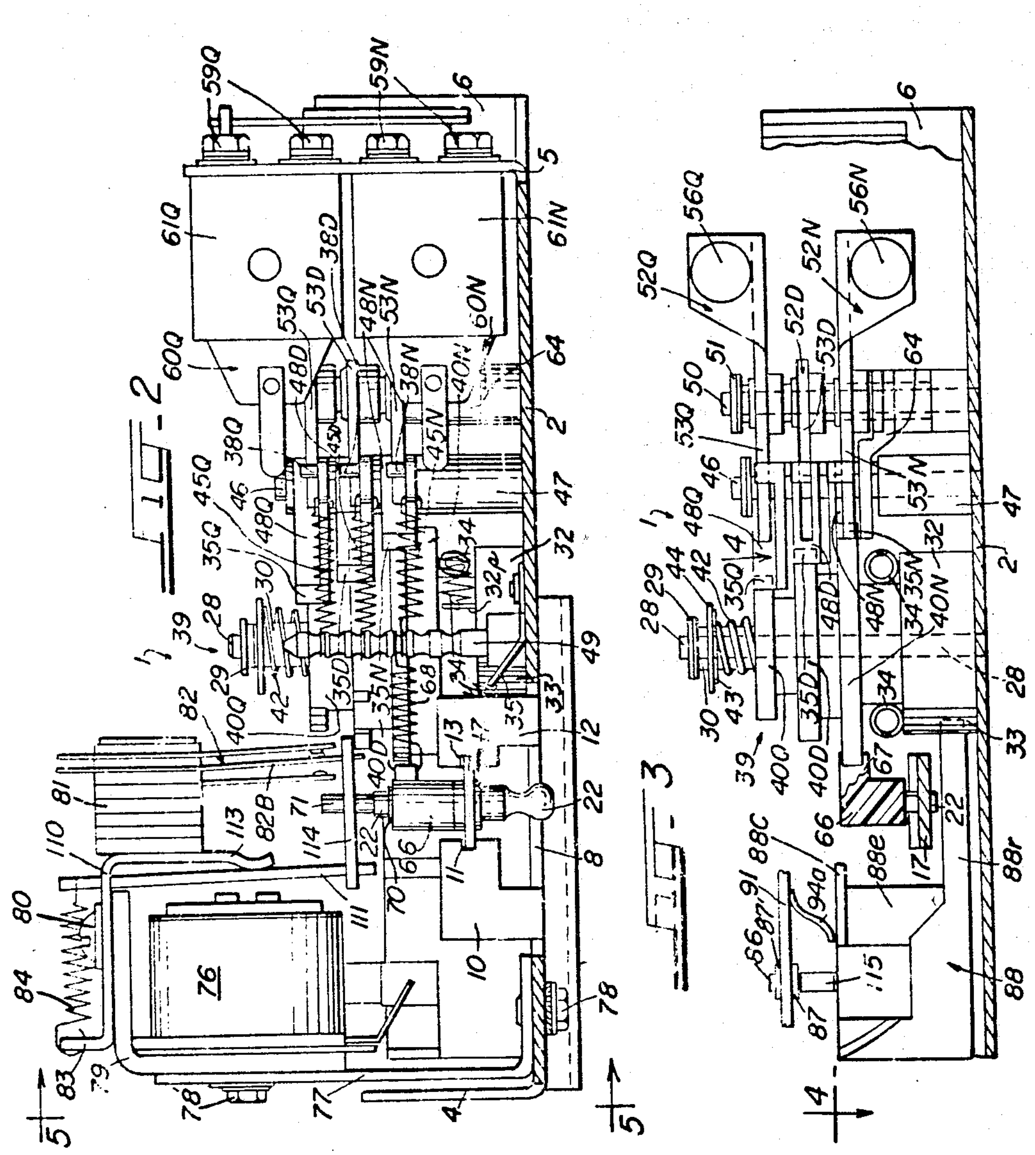
FIGURE 2 is a sectional view taken along the line 2—2 of FIGURE 1.
FIGURE 3 is a sectional view taken along the line 3—3 of FIGURE 1.

A shaft 28 is fixedly mounted on the back frame 2, and a bearing collar 30 is mounted thereupon by a retaining ring 29. A pinion wheel 32, having a set of semicircumferential teeth 33 thereupon (see FIGURE 6), is mounted about the collar 30 for rotation on the shaft 28 adjacent the back frame 2. A spring 34 is affixed at its one end to an upwardly extending post 32*p* of the pinion wheel 32, is wrapped partially about the wheel 32, and is affixed at its opposite end to an eyelet 35 riveted to the back frame 2. In this manner, the pinion wheel 32 is normally biased to rotate in a counterclockwise direction (relative to its FIGURE 1 disposition). A nickel ratchet wheel 40N (shown in detail in FIGURE 6) is affixed to the pinion wheel 32 and thus is mounted upon the collar 30 for rotation relative to the shaft 28 such that the wheels 40N and 32 form a unitary rotatable member. As shown in FIGURE 6, the pinion wheel 32 is provided with an upwardly extending raised platform 32*r* having a raised annular rib 32*r'* extending upwardly therefrom and a raised male tab member 32*s* extending radially from the rib 32*r'*. The ratchet wheel 40N is provided with downwardly extending raised annular ribs 40*r* and 40*r'*. A female slot 40*s* is provided in the rib 40*r'*. and a recessed well 40*w* is defined in the annular space between the ribs 40*r* and 40*r'*. The wheels 40N and 32 are interlocked by placing rib 32*r'* in well 40*w* and tab member 32*s* in slot 40*s*. Alternatively, the pinion wheel 32 and the nickel ratchet wheel 40N could comprise a one-piece molded member. Dime and quarter ratchet wheels 40D and 40Q, each mounted for rotation on the shaft 28 in a manner hereinafter described, are successively positioned on the collar 30 above the ratchet wheel 40N, as best shown in FIGURE 3.

A retaining ring 44 is affixed to the collar 30 and forms a back stop for a bushing 43. A helical spring 42 surrounds the collar member 30 between the bushing member 43 and the quarter ratchet wheel 40Q. As shown in FIGURE 6 the upper surfaces of the nickel ratchet wheel 40N and the dime ratchet wheel 40D are respectively provided with spaced apertures 25N (three in number) and 25D (nine in number). The three apertures 25N are individually designated as 25N1–25N3 respectively and are symmetrically positioned at 120° spacings. Similarly, the nine apertures 25D are individually designated as 25D1–25D9 respectively and are symmetrically positioned at successive 3:2:1 angular spacing ratios (i.e. the clockwise spacings between the apertures 25D1–25D9 in order are 60°, 40°, 20°, 60°, 40°, 20°, 60°, 40°, and 20°). As indicated in dash lines, the lower surfaces of the dime ratchet wheel 40D and the quarter ratchet wheel 40Q are each provided with an individual depending lug 23D and 23Q respectively. The lugs 23D and 23Q are dimensioned to be received within any of the apertures 25N and 25D respectively, thereby to detachably interlock the ratchet wheel 40D at a given angular orientation relative to a fixed position of the ratchet wheel 40N and similarly to detachably interlock the ratchet wheel 40Q at a given angular orientation relative to the ratchet wheel 40D (and therefore to a fixed position of the ratchet wheel 40N). By means of the indicated lug and aperture interlocking arrangements, it is possible to provide a variety of relative angular orientations for each of the ratchet wheels 40D and 40Q relative to the ratchet wheel 40N by merely axially sliding either of the ratchet wheels 40D or 40Q on the collar 30 (against the force of the spring 42), thereby to withdraw the retained lug from a given aperture, and by then rotating the elevated ratchet wheel to a new desired angular orientation and allowing it to snap into place under the influence of the spring 42, as the lug is repositioned in a new aperture.

In this manner, a stacked credit wheel assembly, generally designated by the reference numeral 39, is defined. The assembly 39 comprises the pinion wheel 32 and the nickel ratchet wheel 40N affixed thereto, as well as the dime and quarter ratchet wheels 40D and 40Q, respectively, which are removably affixed to the nickel ratchet wheel 40N.

As best seen in FIGURE 6, the ratchet wheels 40N, 40D, and 40Q are respectively provided with thirty-six (36), thirteen (13), and eight (8) ratchet teeth per wheel, which teeth are respectively indicated by 41N, 41D, and 41Q. The teeth 41N of the nickel ratchet wheel 40N are equally spaced about the circumference thereof (i.e., 10° spacing), and each angular tooth increment is designed to represent a given reference credit value, e.g., in the described embodiment a value corresponding to a U.S. nickel or, alternatively, to a U.S. dime, as hereinafter described. The teeth 41D of the dime ratchet wheel 40D are circumferentially staggered as follows: a first set of six teeth (marked "2" in FIGURE 6), each tooth of the set being spaced from the next successive clockwise tooth by an angular increment corresponding to a two tooth angular increment of the nickel ratchet wheel 40N and thus to two reference credit values (i.e., 20° spacing); a second set of four teeth (marked "3"), each tooth of the set being spaced from the next successive clockwise tooth by an angular increment corresponding to a three tooth angular increment of the nickel ratchet wheel 40N and thus to three reference credit values (i.e., 30° spacing); and a third set of three teeth (marked "4"), each tooth of the set being spaced from the next successive clockwise tooth by an angular increment corresponding to a four tooth increment of the nickel ratchet wheel 40N and thus to four reference credit values (i.e., 40° spacing). The teeth 41Q of the quarter ratchet wheel 40Q are similarly circumferentially staggered as follows: four sets of two teeth each (marked "3," "4," "5," and "6," respectively, in FIGURE 6), each tooth of each set being spaced from the next successive clockwise tooth by angular increments corresponding to three, four, five, and six tooth increments respectively of the nickel ratchet wheel 40N and thus to three, four, five, and six reference credit values respectively (i.e., 30°, 40°, 50°, and 60° spacing respectively).

It should be noted that the designations utilized to identify a given set of teeth in FIGURE 6 are somewhat arbitrary, that is, a clockwise reference system has been utilized above whereas a corresponding counterclockwise reference system could also be utilized (as by shifting each of the markings "2"–"6" in FIGURE 6 one tooth clockwise, such that each tooth of a given set is spaced from the next successive counterclockwise tooth by a given angular increment). For convenience of description, the former (or clockwise) reference system will be utilized herein, although it should of course be understood that both systems are equivalent. Regardless of nomenclature, it is clear that the criterion for any of the sets provided on ratchet wheels 40D and 40Q is to space each tooth of a given set from a next adjacent tooth (that is, from at least one next adjacent tooth and perhaps from both of the next adjacent teeth on either side) by an angular increment corresponding to a multiple of the angular increment of tooth spacing on the ratchet wheel 40N (that is, corresponding to a multiple of the reference credit value).

Escapement pawl means are provided for coaction with the axially aligned ratchet wheels 40N, 40D, and 40Q in order to effect multiple pricing as follows. Quarter, dime, and nickel holding pawls 45Q, 45D, and 45N, respectively, are journaled for rotation on a shaft 46 affixed to the back frame 2. The pawls are mounted on the shaft 46 adjacent the corresponding ratchet wheels 40Q, 40D, and 40N, and a retaining ring 27 maintains the pawls 48Q, 48D, and 48N in the indicated aligned arrangement on the shaft 46. A spacing collar 47 is mounted on the shaft 46 between the pawl 48N and the back frame 2. Each pawl is provided with a holding tooth 36Q, 36D, and 36N, respectively, each such tooth being adapted to engage the corresponding teeth 41Q, 41D, and 41N of the ratchet wheels 40Q, 40D, and 40N. Springs 45Q, 45D, and 45N are connected between the respective pawls 48Q, 48D, and 48N and a post 49 affixed to the back frame 2. Each pawl is also provided with a lug 38Q, 38D, and 38N, respectively, which lugs cooperate with certain solenoid-actuated crank means hereinafter described.

It will be observed that the dime ratchet wheel 40D may be positioned relative to a fixed position of the nickel ratchet wheel 40N (by appropriate interengagement of the lug 23D with the apertures 25N) so that any one of the previously described four sets of dime ratchet teeth 41D may be selectively engaged by the dime holding tooth 36D of the dime holding pawl 45D. For example, the dime holding tooth 36D may be disposed between the first and the second (in a clockwise sense, relative to FIGURE 6) teeth of the first set of six teeth marked "2" in FIGURE 6. For convenience of description, this relative positioning of the dime ratchet wheel 40D and its associated holding tooth 36D will be hereinafter referred to as Position IID. In a similar manner, the dime holding tooth 36D may be disposed between the first and the second teeth (again in a clockwise sense) of either of the second or third sets of ratchet teeth 41D (marked "3" and "4" respectively in FIGURE 6) so as to define Positions IID and IVD respectively. Additionally, the quarter ratchet wheel 40Q may be positioned relative to the dime ratchet wheel 40D (and therefore relative to a fixed position of the nickel ratchet wheel 40N) by appropriate interengagement of the lug 23Q and the apertures 25D so as to dispose any of the four sets of quarter ratchet teeth 41Q adjacent the corresponding quarter holding tooth 36Q. Disposition of the quarter holding tooth 36Q between the teeth marked "3," "4," "5," and "6" in FIGURE 6 will be respectively referred to hereinafter as Positions IIIQ, IVQ, VQ, and VIQ.

The said solenoid-actuated crank means comprise quarter, dime, and nickel cranks 52Q, 52D, and 52N, respectively, which are rotatably journaled on a shaft 50 which is affixed to the back frame 2. An escapement pawl 64 is also rotatably journaled on the shaft 50. The escapement pawl 64 is mounted adjacent the back frame 2, and the cranks 52N, 52D, and 52Q are spaced between a retaining ring 51 and the escapement pawl 64 in corresponding alignment with the respective nickel, dime, and quarter sets of ratchet wheels and pawls 40, 48N; 40, 48D; and 40, 48Q. Each of the cranks 52Q, 52D, and 52N is provided with a depending leg portion 53Q, 53D, and 53N respectively, extending downwardly from the shaft 50 and overlying (relative to the FIGURE 1 disposition) the corresponding lug 38Q, 38D, and 38N provided on the pawls 48Q, 48D, and 48N, respectively. Similarly, each crank 52Q, 52D, and 52N is provided with an upwardly extending leg portion 54 (the leg portion 54Q being shown in FIGURE 1, and the leg portions 54N and 54D being obscured from view) which extend upwardly from the shaft 50. An off-shoot leg portion 55 is also provided extending to the left (in FIGURE 1) from each leg portion 54 (only the off-shoot leg portion 55Q being shown in FIGURE 1). Each crank is also provided with a perpendicularly extending flange 56. The flange 56Q of the crank 52Q is shown in FIGURE 1 extending perpendicularly upwardly from the plane of the drawing; the flange 56D of the crank 52D is shown in FIGURE 1 extending perpendicularly downwardly from the plane of the drawing; and the corresponding flange 56N of the crank 52N is obscured from view in FIGURE 1, but is located immediately below the flange 56Q shown in FIGURE 1, as illustrated in FIGURE 3.

Each crank 52 is biased to a counterclockwise position (relative to the FIGURE 1 disposition) by spring interconnections between the respective cranks and a post 58 fixed to the back frame, so that the depending leg portion 53 of each crank 52 engages the corresponding lug 38 of the pawls 48. Only the spring 57Q is shown in FIGURE 1, although the corresponding springs for the cranks 52D and 52N are located immediately below the said spring 57Q and function analogously.

Bolt assemblies 59Q and 59N mount angle brackets 61Q and 61N respectively to the right flange 5, as shown in FIGURES 1 and 2. Similarly, bolt assemblies 59D mount an angle bracket 61D to the right top flange 6, as shown in FIGURE 1. Quarter, dime, and nickel solenoids 60Q, 60D, and 60N respectively are affixed to the respective brackets 61Q, 61D, and 61N. A guide plate 62 is affixed to the right top flange 6 by a bolt assembly 63, and the plate 62 overlies the slot provided between the two bifurcated legs of the flange 6. Four slots (not shown) are provided in the guide plate 62 for receiving the uppermost extremities of the respective cranks 52Q, 52D, and 52N and of the holding pawl 64, such that the plate 62 serves as a bearing guide for the respective rotations of the cranks 52Q, 52D, and 52N and of the holding pawl 64.

The escapement pawl 64 is provided with a tooth portion 64T (see FIGURE 1) which is adapted to engage the teeth 41N of the nickel ratchet wheel 40N. A spring (not shown) interconnects the escapement pawl 64 and the post 58 (analogously to the spring 57Q shown in FIGURE 1) and normally urges the escapement pawl 64 into engagement with the teeth 41N of the nickel ratchet wheel 40N so as to impede the rotation thereof. The escapement pawl 64 is provided with a perpendicularly extending cylindrical portion 65 which extends into the respective wells formed between the leg portions 54 and 55 of each crank 52Q, 52D, and 52N, so that clockwise rotation of any one of the said cranks will serve to disengage the tooth portion 64T from the teeth 41N of the nickel ratchet wheel.

A subtract pawl 66 (see FIGURES 1 and 4) is pivotally mounted on the knob shaft 22 of the credit cancel slide 17 adjacent the lower end thereof by a retaining ring 70. The subtract pawl 66 is provided with a pawl tooth 67 which is adapted to engage the teeth 41N of the nickel ratchet wheel 40N, and a spring 68, which interconnects the pawl 66 and the post 49, normally biases the pawl 66 to a clockwise disposition, as shown in FIGURES 1 and 4. A subtract adjustment plate 72 (see FIGURE 4) is mounted atop the credit cancel slide 17 by a bolt assembly 73, which is received in an elongated slot 72S of the cam plate 72. The plate 72 is provided with a downwardly extending cam leg 74 having a cam surface 74C thereupon. A pin 75 extends perpendicularly downwardly from the subtract pawl 66 toward the credit cancel slide 17 such that (as shown in FIGURE 4) the lowermost extremity of the cam leg 74 limits the maximum clockwise rotation of the subtract pawl 66 as the pin 75 is impeded by the cam leg 74.

In this rest position of the subtract pawl 66, upward movement of the credit cancel slide 17 will effect an interengagement between the pawl tooth 67 of the subtract pawl 66 and the teeth 41N of the ratchet wheel 40N such that the ratchet wheel 40N will be caused to rotate clockwise by a two tooth angular increment (or by two reference credit values) as the credit cancel slide 17 extends to its uppermost position under the influence of the spring 21. However, the bolt assembly 73 may be loosened, and the subtract adjustment plate 72 may be lowered relative to the credit cancel slide 17 (by virtue of the elongated slot 72S of the plate 72), such that the cam surface 74C of the plate 72 engages the pin 75 of the subtract pawl 66, thereby to position the subtract pawl 66 at a new rest position which is counterclockwise relative to the rest position shown in FIGURES 1 and 4. In this relatively counterclockwise rest position, a corresponding upward movement of the credit cancel slide 17 will again cause interengagement between the pawl tooth 67 and the ratchet teeth 41N, but in this instance the ratchet wheel 40N will be caused to rotate clockwise by only a one tooth angular increment (or by one reference credit value). Thus, the relative positioning of the subtract adjustment plate 72 on the credit cancel slide 17 serves as a means for rotating the ratchet wheel 40N by either a one tooth or a two tooth angular increment in a clockwise direction, as desired. For convenience of description, the two indicated positions of the subtract adjustment plate 72 will hereinafter be referred to as Subtract Positions I and II, corresponding respectively to the one reference credit value (or one tooth) position and to the two reference credit value (or two tooth) position.

A mounting bracket 77 is affixed to the back frame 2 by a bolt 78 (FIGURE 2), and an L-bracket 79 is affixed to the mounting bracket 77 by a bolt 78'. A slotted bracket 110 is mounted on the L-bracket 79 by bolt assemblies 80, and a clapper 111 is pivotally mounted in a slot 112 of the bracket 110. A spring 84 interconnects the uppermost extreme of the clapper 111 and a perpendicularly extending portion 83 of the bracket 110 so as to normally bias the clapper 111 to a counterclockwise position (relative to its FIGURE 2 disposition) adjacent a back stop member 113 which is an integral downwardly extending portion of the bracket 110 (see FIGURE 2). An insulator block 81 is mounted on the back stop member 113, and an electrical contact assembly, generally designated by the reference numeral 82, extends downwardly from the insulator block 81 toward the credit cancel slide 17. A guide plate 114 is secured to the lowermost extreme of the clapper 111 and extends perpendicularly therefrom in parallel alignment with the credit cancel slide 17 (see FIGURE 2). The guide plate 114 is provided with a slot 85 (shown in dot-dash in FIGURE 4), which slot receives a lug 71 which extends perpendicularly upwardly from the subtract pawl 66 pivotally carried by the credit cancel slide 17. The guide plate 114 also receives a lowermost extreme of a contact blade 82B which is a part of the contact assembly 82.

An album subtract relay 76 is mounted on the L-bracket 79 and is adapted when energized to pivot the clapper 111 in a clockwise direction (relative to its FIGURE 2 disposition) against the force of the spring 84. This movement of the clapper 111 causes a counterclockwise pivoting of the subtract pawl 66 to the dot-dash position shown in FIGURE 4 by virtue of the interengagement of the lug 71 with the slot 85 of the guide plate 114. Also, the corresponding induced movement of the contact blade 82B of the contact assembly 82 is adapted to open-circuit some switch contacts and to close-circuit others (for purposes hereinafter described). When actuated to the described dot-dash counterclockwise position shown in FIGURE 4, the subtract pawl 66 cooperates with portions of a crank member 88, as hereinafter described.

Figure 7:
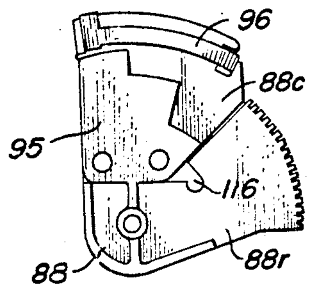
FIGURE 7 is a top plan view of a crank member utilized in the multiple pricing unit.
Figure 8:
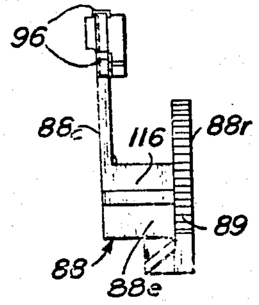
FIGURE 8 is a side elevational view of the member shown in FIGURE 7.

As shown in FIGURES 7 and 8, the crank member 88 comprises a rack segment 88*r*, a contactor segment 88*c*, and an offset joinder portion 88*e*. The crank member 88 is rotatably journaled on a shaft 86 affixed to the back frame 2, and a lower retaining ring 87 positions a spacing collar 115, which is mounted on the shaft 86, above the crank member 88. The rack segment 88*r* of the crank member 88 is provided with teeth 89 which intermesh with the teeth 33 of the pinion wheel 32, such that counterclockwise rotation of the crank member 88 effects clockwise rotation of the pinion wheel 32 and such that counterclockwise rotation of the pinion wheel 32 effects clockwise rotation of the crank member 88, as hereinafter described. As shown in FIGURE 4, a stud 90 is affixed to the back frame 2 in the path of movement of the rack segment 88*r* so as to limit the maximum counterclockwise rotation thereof. A rib 116 extends outwardly from the joinder portion 88*e* of the crank member 88, and the subtract pawl 66 is adapted to engage the rib 116 when rotated to its dot-dash subtract position (shown in FIGURE 4) so as to cause counterclockwise rotation of the crank member 88 to an extreme position until the peripheral edge of the rack segment 88*r* is impeded by the stud 90 of the back frame 2. In this dot-dash subtract position, subtract pawl 66 does not directly engage ratchet wheel 40N (as in the previously described Subtract Positions I and II); however, by engaging the rib 116, subtract pawl 66 rotates ratchet wheel 40N to its normal rest position, since reciprocation of credit cancel slide 17 causes counterclockwise rotation of crank member 88 and corresponding clockwise rotation of pinion wheel 32.

Figure 9:
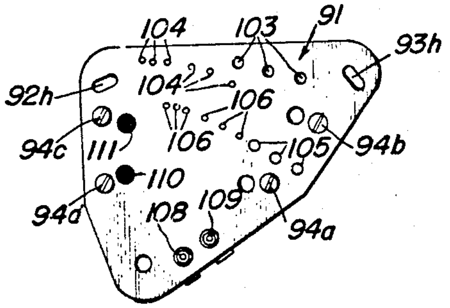
FIGURE 9 is a top plan view of a terminal plate assembly utilized in the multiple pricing unit.
Figure 10:
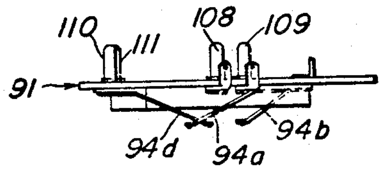
FIGURE 10 is a front elevational view of the assembly shown in FIGURE 9.

A terminal plate 91 (shown in detail in FIGURES 9–11) is fixedly positioned on the shaft 86 and is sandwiched between the previously described lower retaining ring 87 and an upper retaining ring 87'. Bolts 92 and 93, which pass through the holes 92*h* and 93*h* respectively of the terminal plate 91 affix the terminal plate 91 to the Z-shaped plate 14.

Figure 11:
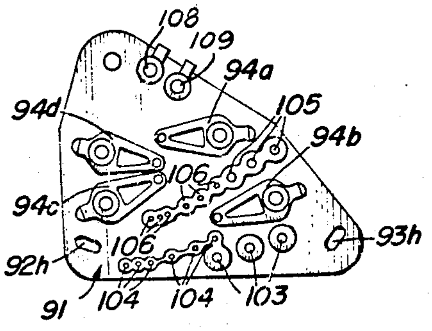
FIGURE 11 is an inverted bottom plan view of the assembly shown in FIGURE 9.

Contact fingers 94*a*, 94*b*, 94*c*, and 94*d* are riveted to the underside of the terminal plate 91, as best seen in FIGURE 11. These contact fingers are adapted to cooperate by brush contact with electrical contact areas 95 and 96 provided on the uppermost surface of the contactor segment 88*c*, as indicated in FIGURE 3. The terminal plate 91 is provided with four sets of apertures comprising sets of three relatively large holes 103 and 105 and sets of six relatively small holes 104 and 106. Conductive pins 101 and 102 (shown in dash in FIGURE 1) are adapted for placement in any designated one of the respective holes 104 and 106 so as to pass through the terminal plate 91 for conductive engagement with the respective contact areas 95 and 96 positioned atop the contactor area 88*c* of the crank member 88. Spring tab members 97 and 98 (FIGURE 1) are removably mounted on top of the terminal plate 91 by the respective screws 99 and 100. The screws 99 and 100 pass through a given hole in the respective sets of holes 103 and 105. The spring tabs 97, 98 serve to bias the respective conductive pins 101, 102 downwardly into engagement with the contact areas 95 and 96 of the contactor segment 88*c*. As indicated, the pins 101, 102 may be shifted as desired within the respective sets of holes 104, 106, and the spring tabs 97, 98 may be shifted accordingly by corresponding placement of the screws 99, 100 in an appropriate hole of the sets of holes 103, 105.

In actual practice, as hereinafter described, the pins 101 and 102 are placed in corresponding holes of the respective sets of holes 104 and 106, that is, when the pin 101 is placed in the extreme left hand hole of the said 104 (relative to the FIGURE 9 disposition), the pin 102 is correspondingly placed in the extreme left hand hole of the set 106. For convenience of description, placement of the pins 101 and 102 in the indicated extreme left hand holes will be hereinafter referred to as Album Credit Position IV. Similarly, placement of the pins 101 and 102 in each of the next succeeding holes of the sets 104 and 106 (i.e., to the right in the FIGURE 9 disposition) will be referred to respectively as Album Credit Positions V, VI, VIII, X, and XII.

Electrical connection means, such as the terminal plugs 108, 109, 110, and 111, are provided on the terminal plate 91 in order to effect certain electrical connections hereinafter described. For purposes of simplicity, the electrical elements affixed to the terminal plate 91 and to the contactor segment 88*c* have been schematically represented in FIGURE 12 and will be referred to in greater detail hereinafter in terms of a description of the electrical operation of the subject multiple pricing unit.

In terms of mechanical operation, the multiple pricing unit 1 operates as follows. In a rest or standby position, the credit cancel slide 17 is located in its lowermost position wherein the spring 21 is compressed, and the slide actuating lever 24 locks the credit cancel slide 17 in the indicated position, as shown in FIGURE 5. The rack segment 88*r* is rotated to an extreme counterclockwise position adjacent the stud 90, and the pinion wheel 32 (and therefore the nickel ratchet wheel 40N) is correspondingly rotated to an extreme clockwise position (relative to the FIGURE 1 disposition) against the force of the spring 34. The pinion wheel 32 is locked in this rest or standby position by virtue of the interengagement of the escapement pawl 64 with the nickel ratchet wheel 40N.

When an appropriate signal is received in the unit to energize the nickel solenoid 60N (as, for example, by momentary depression of a conventional coin switch which is adapted to energize the nickel solenoid 60N), the nickel crank 52N is momentarily rotated in a clockwise direction (relative to its FIGURE 1 disposition) against the force of its biasing spring (not shown). As previously described, this movement of the nickel crank 52N causes a clockwise rotation of the escapement pawl 64, thereby to release the nickel ratchet wheel 40N for counterclockwise rotation under the influence of the spring 34 affixed to the pinion wheel 32. However, the indicated rotation of the nickel crank 52N also simultaneously releases the nickel holding pawl 48N, which then rotates clockwise (relative to its FIGURE 1 disposition) so that the tooth 36N of the nickel pawl 48N intermeshes with the teeth 41N of the nickel ratchet wheel 40N, so as to eventually arrest the movement thereof. The release of the escapement pawl 64 and the simultaneous actuation of the pawl 48N operates in the well known Geneva escapement manner to limit the extent of angular rotation for the ratchet wheel 40N to a one tooth angular increment.

Thus, in effect each signal established by momentary energization of the nickel solenoid 60N establishes a degree of credit within the multiple pricing unit 1 corresponding to one tooth angular increment of rotation for the stacked credit wheel assembly 39. This increment is a reference credit value which, in the described embodiment, may correspond to a nickel value. The indicated one tooth angular movement of the wheel assembly 39 is of course accompanied by a corresponding degree of counterclockwise rotation for the pinion wheel 32 (relative to the FIGURES 1 and 4 dispositions), which in turn effects a corresponding clockwise rotation of the crank member 88, and, as hereinafter described, the relative positioning of the crank member 88 and the terminal plate 91 serves to electrically signal the established reference credit value.

Similarly, when an appropriate signal is received in the unit so as to energize the dime solenoid 60D, the dime crank 52D is momentarily rotated in a clockwise direction (relative to its FIGURE 1 disposition) against the force of its biasing spring (not shown). As previously described, this movement of the dime crank 52D causes a clockwise rotation of the escapement pawl 64, thereby to release the stacked credit wheel assembly 39 for counterclockwise rotation under the influence of the spring 34 affixed to the pinion wheel 32. The indicated rotation of the dime crank 52D also releases the dime pawl 48D, which then rotates clockwise (relative to its FIGURE 1 disposition) so that the tooth 36D of the dime pawl 48D intermeshes with the teeth 41D of the dime ratchet wheel 40D, so as to eventually arrest the movement thereof. Obviously, for any given operation, the angular positioning of the dime ratchet wheel 40D relative to the dime pawl 48D will determine the extent of rotation for the dime ratchet wheel 40D (and therefore of the stacked credit wheel assembly 39), since, if the tooth 36D of the dime pawl 48D intermeshes with the first, second, or third sets of teeth 41D on the dime ratchet wheel 40D (i.e., Positions IID, IIID, or IVD, respectively), the dime ratchet wheel 40D will rotate by a two tooth, three tooth, or a four tooth angular increment, respectively, in a counterclockwise direction. Since it is possible to selectively position the dime ratchet wheel 40D relative to the nickel ratchet wheel 40N by appropriate placement of the lug 23D in any of the apertures 25N so as to dispose either the first, second, or third sets of dime ratchet teeth in the vicinity of the dime pawl tooth 36D, each momentary energization of the dime solenoid 60D may establish a degree of credit within the multiple pricing unit 1 corresponding to a two, three, or four tooth angular increment or, in the described embodiment, to twice, three times, or four times the reference credit value, as desired. Also, the degree of rotation of the dime ratchet wheel 40D (and therefore of the pinion wheel 32) is accompanied by a corresponding rotation of the crank member 88 so that the relative positioning of the crank member 88 and the terminal plate 91 may serve to electrically signal the established credit value, as hereinafter described.

Finally, when an appropriate signal is received in the unit so as to energize the quarter solenoid 60Q, the quarter crank 52Q is momentarily rotated in a clockwise direction (relative to its FIGURE 1 disposition) against the force of its biasing spring 57Q. As previously described, this movement of the quarter crank 52Q causes a clockwise rotation of the escapement pawl 64, thereby to release the stacked credit wheel assembly 39 for counterclockwise rotation under the influence of the spring 34 affixed to the pinion wheel 32. The indicated rotation of the quarter crank 52Q also releases the quarter pawl 48Q, which then rotates clockwise (relative to its FIGURE 1 disposition) so that the tooth 36Q of the quarter pawl 48Q intermeshes with the teeth 41Q of the quarter ratchet wheel 40Q, so as to eventually arrest the movement thereof. For any given operation, the angular positioning of the quarter ratchet wheel 40Q relative to the pawl 48Q will determine the extent of rotation for the quarter ratchet wheel 40Q (and therefore of the stacked credit wheel assembly 39), since, if the tooth 36Q of the quarter pawl 48Q intermeshes with the first, second, third, or fourth sets of quarter teeth 41Q on the quarter ratchet wheel 40Q (i.e., Positions IIIQ, IVQ, VQ, or VIQ, respectively), the quarter ratchet wheel 40Q will rotate by a three tooth, four tooth, five tooth, or six tooth angular increment, respectively, in a counterclockwise direction. Since it is possible to selectively position the quarter ratchet wheel 40Q relative to the dime ratchet wheel 40D (and therefore relative to the nickel ratchet wheel 40N) by appropriate placement of the lug 23Q in any of the apertures 25D so as to dispose either the first, second, third, or fourth sets of quarter ratchet teeth 41Q in the vicinity of the quarter pawl tooth 36Q, each momentary energization of the quarter solenoid 60Q may establish a degree of credit within the multiple pricing unit 1 corresponding to a three, four, five, or six tooth angular increment or, in the described embodiment to three times, four times, five times, or six times the reference credit value, as desired. Also, the degree of rotation of the quarter ratchet wheel 40Q (and therefore of the pinion wheel 32) is accompanied by a corresponding rotation of the crank member 88 so that the relative positioning of the crank member 88 and the terminal plate 91 may serve to electrically signal the established credit value, as hereinafter described.

From the foregoing description, it should be appreciated that the multiple pricing unit 1 can also cumulatively establish credit values for successive coin signals of the same denomination, that is, for example, two successive signals established by momentary energization of the nickel solenoid 60N can establish a degree of credit within the multiple pricing unit 1 corresponding to a two tooth angular increment or to twice the reference credit value.

Once credit is established by appropriate energization of any of the solenoids 60N, 60D, or 60Q, and by the corresponding rotation imparted to the stacked credit wheel assembly 39, which determines the relative positioning of the crank member 88 and of the terminal plate 91, credit subtraction is accomplished as follows. Each selection of a single record play causes cyclic energization of the drive motor assembly 26 (as hereinafter described) which in turn causes the credit cancel slide 17 to reciprocate by means of the slide actuating lever 24 (see FIGURE 5) in the manner previously described. As the credit cancel slide 17 moves upwardly (relative to its FIGURES 1 and 4 disposition), the subtract pawl 66 causes the stacked credit assembly 39 to rotate clockwise (relative to its FIGURES 1 and 4 disposition) by either a one tooth or a two tooth angular increment for each reciprocable stroke of the credit cancel slide 17 (depending upon whether the subtract adjustment plate 72 is stationed in its Positions I or II, respectively, relative to the credit cancel slide 17). This reverse movement of the stacked credit wheel assembly 39 alters the relative positioning of the crank member 88 and the terminal plate 91 and tends to revert the crank member 88 to its maximum counterclockwise rest or standby position, as impeded by the stud 90. Also, when an album record play is selected, the relay 76 is energized (as hereinafter described) so as to move the subtract pawl 66 to the dot-dash position shown in FIGURE 4 which, as previously described, causes rotation of the crank member 88 to its maximum counterclockwise disposition adjacent the stud 90 as the credit cancel slide 17 reciprocates. Thus, a single record play will erase either one or two reference credit values, as desired, and an album record play will erase all reference credit values that are established by the relative positioning of the crank member 88 and the terminal plate 91.

Figure 12:
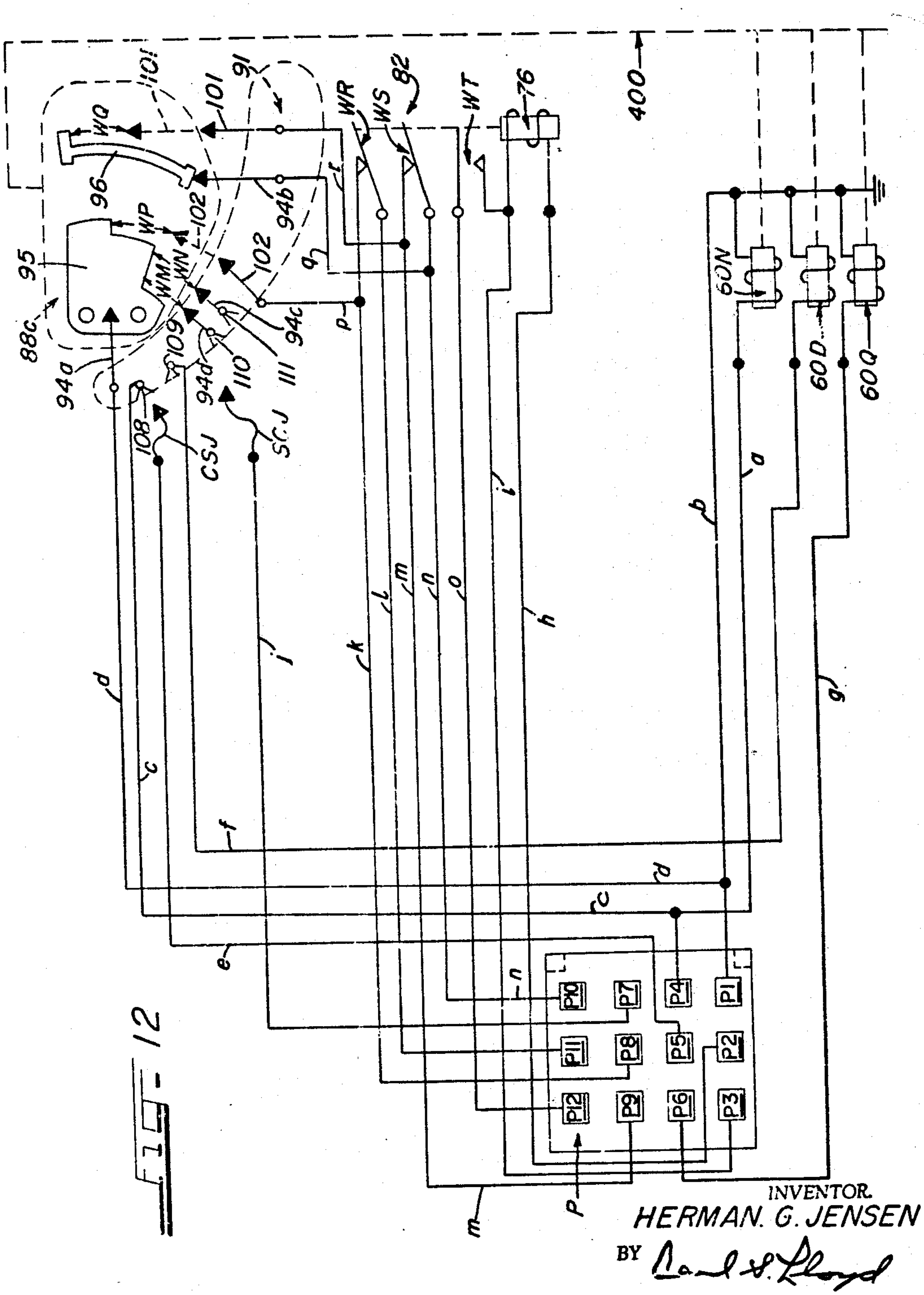
FIGURE 12 is a circuit diagram showing schematically electrical components of the multiple pricing unit.

The described operation also functions to electrically signal the established credit value for selection and play of an appropriate record. FIGURE 12 is a circuit diagram which shows in schematic representation certain electrical components of the multiple pricing unit 1. The previously described contactor segment 88*c* of the crank member 88 and the terminal plate 91 are schematically shown in FIGURE 12. The previously described contact areas 95 and 96 of the contactor segment 88*c* are also shown associated with the schematic contactor segment 88*c*, and the previously described contact pins 101 and 102, the contact fingers 94*a–d*, and the plugs 108–111 of the terminal plate 91 are shown schematically in FIGURE 12.

Finally, the previously described solenoids 60N, 60D, and 60Q and the subtract relay 76, with its associated contact blade assembly 82, are shown in FIGURE 12. The assembly 82 comprises a relay hold switch WT, a single play signal switch WS, and an album select light switch WR. Switch WT is normally opened, while switches WR and WS are normally closed. Each of the switches WR, WS, and WT is actuated by energization of relay 76, as indicated in FIGURE 12.

An album play signal switch WQ is defined between the contact area 96 and the pin 101, and similarly an album credit start switch WP is defined between the contact area 95 and the pin 102. The full line positions for the pins 101 and 102 in FIGURE 12 correspond to Album Credit Position XII, that is, the crank member 88 must rotate with respect to the terminal plate 91 by an amount corresponding to twelve reference credit values before the respective switches WP and WQ will close. The phantom line positions for the contact pins 101 and 102 correspond to Album Credit Position VI, that is, the switches WP and WQ will be closed when six reference credit values are established in the multiple pricing unit 1.

The contact fingers 94*a* and 94*b* are disposed with respect to the contact areas 95 and 96 respectively such that electrical connection is maintained between the contact finger 94*a* and the contact area 95 and between the contact finger 94*b* and the contact area 96, regardless of the angular orientation of the contactor segment 88*c* with respect to the terminal plate 91. Single credit start switches WN and WM are defined between the respective contact fingers 94*c*, 94*d* and the contactor area 95. The switch WN will be closed when the contactor segment 88*c* rotates with respect to the terminal plate 91 by an amount corresponding to one reference credit value, while correspondingly the switch WM will be closed when two reference credit values are established in the unit 1.

A plug member P, having the individual plugs P1–12 thereon, is schematically shown in FIGURE 12. A lead *b* interconnects grounded plug P1 and one end of nickel solenoid 60N, while a lead *a* interconnects the opposite end of the solenoid 60N to plug P4. A lead *c* interconnects plug P4 with plug 108 of terminal plate 91, and a lead *d* interconnects plug P1 with contact finger 94*a* of terminal plate 91 (and therefore with contact area 95 of the contactor segment 88*c*). A lead *e* interconnects plug P5 with a coin switch jumper CSJ, which is adapted for connection either to plug 109 or to plug 108 of terminal plate 91. Likewise, a lead *j* interconnects plug P7 with a single credit jumper SCJ, which is adapted for connection either to plug 110 or to plug 111. Plug 109 is connected to one end of dime solenoid 60D by a lead *f*, and the opposite end of the solenoid 60D is connected to grounded plug P1. A lead *g* interconnects plug P6 with one end of the quarter solenoid 60Q, and the opposite end of the solenoid 60Q is connected to grounded plug P1.

A lead *h* interconnects plug P2 with one end of album substract relay 76, and a lead *i* connects the other end of relay 76 with plug P3. A lead *o* is connected to plug P12, and relay hold switch WT is connected across the leads *o* and *i*. Leads *m* and *n* are connected to plugs P9 and P10 respectively, and single play signal switch WS is connected across the said leads *m* and *n*. Similarly, leads *k* and *l* are connected to plugs P8 and P11 respectively, and album select light switch WR is connected across the said leads *k* and *l*. Leads *p*, *q*, and *r* respectively interconnect leads *k*, *n*, and *m* to contact pin 102, contact finger 94*b*, and contact pin 101 of terminal plate 91.

The interconnection schematically indicated by the reference numeral 400 in FIGURE 12 indicates that energization of the respective solenoids 60N, 60D, and 60Q can serve to effect relative movement of the contactor segment 88*c* wtih respect to the terminal plate 91, as previously described. This movement is calibrated to close switches WN and WM upon establishment of one and two reference credit values respectively, and similarly, switches WP and WQ can be closed upon establishment of four, five, six, eight, ten, or twelve reference credit values depending upon the respective positioning of the contact pins 101 and 102 in the Album Credit Positions IV, V, VI, VIII, X and XII.

Figure 13:
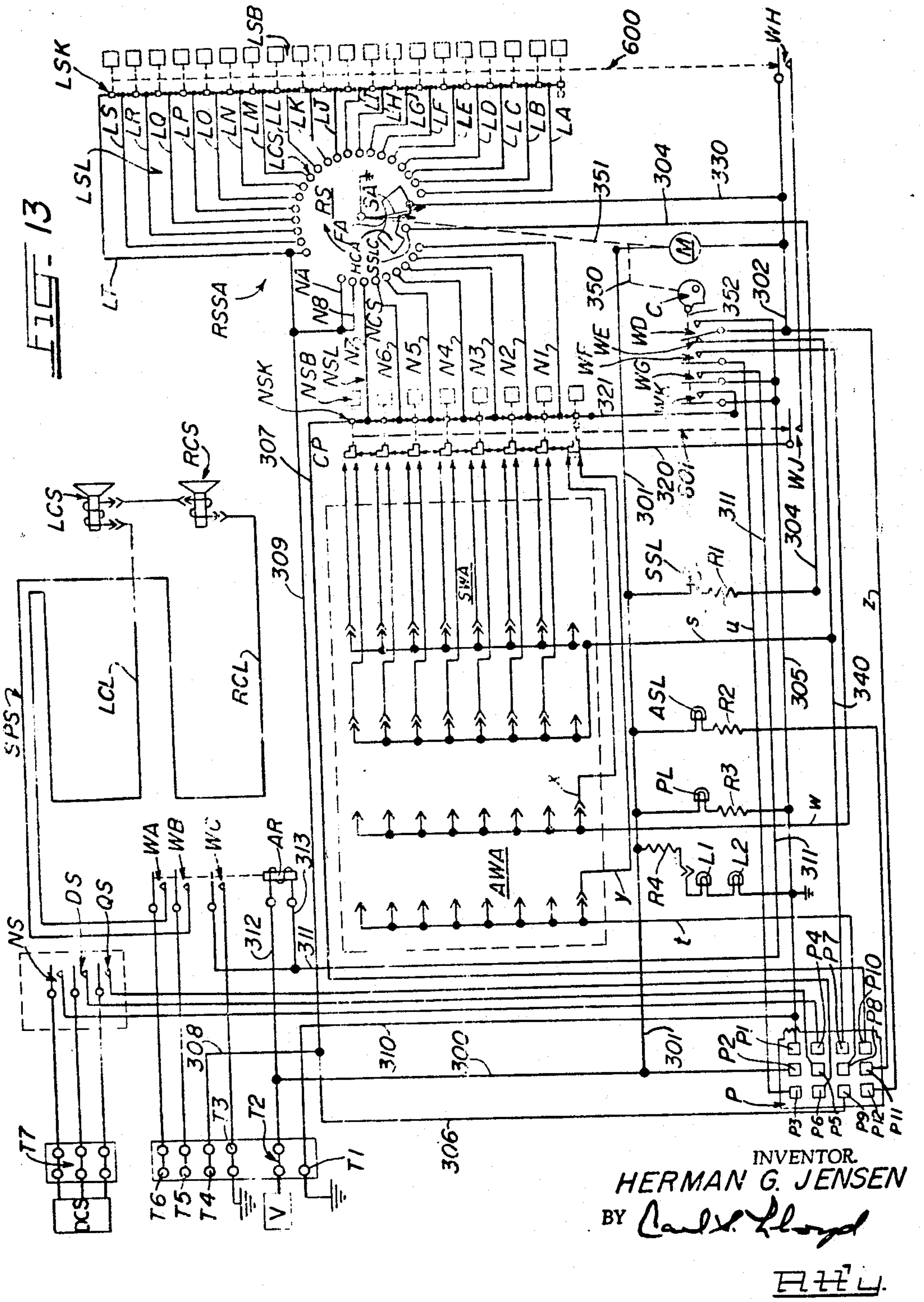
FIGURE 13 is a circuit diagram showing circuitry elements of a remote phonograph unit adapted for connection with the circuitry elements shown in FIGURE 7.

FIGURE 13 illustrates schematically certain circuitry components of a remote unit coin-operated phonograph with which the circuitry elements of FIGURE 12 are adapted to cooperate. The plug P, with its individual plugs P1–P12, is again illustrated in FIGURE 13, and a given lead connected to a given individual plug in FIGURE 13 should be considered as connected to the corresponding individual plug in FIGURE 12. The FIGURE 13 circuitry comprises terminals T1–T7. A voltage source indicated by V is connected to terminal T2, and terminals T1 and T3 are grounded. Lead 310 interconnects grounded terminal T1 and plug P1, which was previously referred to as grounded in connection with the FIGURE 12 description. A lead 300 interconnects terminal T2 and plug P2, and one end of an audio relay AR is also connected to terminal T2 by a lead 312, while a lead 313 connects the opposite end of the audio relay AR to a lead 311. A normally opened relay hold switch WC, which is closed upon energization of audio relay AR, is connected in series with audio relay AR and is grounded at terminal T3.

Normally opened switches WA and WB are relay controlled audio switches which are adapted to be closed upon energization of audio relay AR. Switches WA and WB are connected respectively between the terminals T6, T5, and left channel and right channel speakers LCS, RCS by the respective left channel and right channel leads LCL, RCL. Terminals T5 and T6 are adapted to receive appropriate audio signals (by means not shown) from a main phonograph unit (not shown) which stores and selects records for play. These audio signals are transposed to the speakers LCS and RCS when the switches WA and WB are closed so as to develop stereophonic sound in the remote phonograph unit. The reference character SPS generally indicates the described stereophonic play system for the remote phonograph unit.

Nickel, dime, and quarter coin switches NS, DS, and QS, respectively, are connected between terminal T7 and plugs P4, P5, and P6, respectively. Terminal T7 is connected to a direct current source DCS such that momentary closure of each of the switches NS, DS, and QS (in a conventional manner by the deposit in the remote phonograph unit of a corresponding nickel, dime, or quarter coin) will momentarily pass a signal to the respective plugs P4, P5, and P6.

A conventional rotary switch selection assembly RSSA is schematically illustrated in FIGURE 13. This assembly comprises a first series of lettered signal buttons generally indicated by LSB and a second series of numbered signal buttons generally indicated by NSB. In a conventional manner, a series of lettered signal leads generally indicated by LSL and of corresponding lettered signal contacts generally indicated by LSC is provided corresponding to the lettered signal button LSB. A series of conductive lettered signal keys generally indicated by LSK is also provided corresponding to the lettered signal buttons LSB and, in a conventional manner, the keys LSK normally interconnect all of the leads LSL. The lettered signal leads LSL are individually identified in FIGURE 13 as leads LA–LT inclusive, and, for convenience of description herein, the respective lettered signal buttons LSB, lettered signal keys LSK, and lettered signal contacts LSC may be individually referred to by the corresponding "A–T" notation, although not specifically so illustrated in FIGURE 13. For example, the button, key, and contact corresponding to lead LT may be referred to as LSB(T), LSK(T), and LSC(T), respectively.

As is well known, a mechanical linkage (generally indicated by 600 in FIGURE 13) is provided between the buttons LSB and the keys LSK so that depression of any one of the buttons LSB will displace is corresponding key LSK (as indicated in phantom for the key LSK(A) in FIGURE 13). By the indicated movement of a selected key LSK, the originally mutually interconnected leads LSL are split into two groups, namely a first group comprising the lead corresponding to the selected button and all leads, if any, corresponding to buttons above (relative to the FIGURE 13 disposition) the selected button, and a second group comprising all leads, if any, corresponding to buttons below (relative to the FIGURE 13 disposition) the selected button.

Similarly, a series of numbered signal leads generally indicated by NSL and of corresponding numbered signal contacts generally indicated by NSC is provided corresponding to the numbered signal buttons NSB. A series of conductive numbered signal keys generally indicated by NSK is also provided corresponding to the numbered signal buttons LSB. An additional series of conductive contact plugs generally indicated by CP is also provided corresponding to the numbered signal buttons NSB. The numbered signal leads NSL are individually identified in FIGURE 13 as leads N1–N8 inclusive, and, for convenience of description herein, the respective numbered signal buttons NSB, numbered signal keys NSK, numbered signal contacts NSC, and contact plugs CP may be individually referred to by the corresponding "1–8" notation, although not so specifically illustrated in FIGURE 13. For example, the button, key, contact, and contact plug corresponding to lead N1 may be referred to as NSB(1), NSK(1), NSC(1), and CP(1), respectively.

The numbered signal keys NSK ordinarily serve to mutually interconnect each of the numbered signal leads N1–N7 with each other and with a lead 307 and a lead 321, as shown in FIGURE 13. However, the lead N8 is connected to a lead 309 (which also connects to the mutually interconnected lettered signal leads LSL), and an auxiliary carry-over lead generally indicated by NA is connected to the lead N8.

A mechanical linkage (generally indicated by 601 in FIGURE 13) is provided between numbered signal buttons NSB and numbered signal keys NSK and contact plugs CP so that depression of any one of the buttons NSB will displace its corresponding numbered signal key NSK and its corresponding contact plug CP (as indicated in phantom for key NSK(1) and the contact plug CP(1) in FIGURE 13). If button NSB(8) is selected, leads N1—N7 are open circuited with respect to lead 307, while if button NSB(1) is selected, leads N1-N7 remain connected to lead 307. Selection of an intermediate button, such as button NSB(4), causes the lead N4 corresponding thereto and the leads N5-N7 to remain connected to lead 307, while the leads N1-N3 are open circuited with respect to lead 307.

The corresponding displacement of one of the contact plugs CP has the following effect. Each contact plug CP is adapted when displaced to connect to a paired set of leads (such as the leads $x$ and $y$ shown in FIGURE 13) disposed in the path of movement thereof. However, as schematically indicated by the L-shape for the contact plugs CP, displacement of a contact plug CP retains the displaced contact plug in electrical connection with the plugs below it (relative to the FIGURE 13 disposition), while open-circuiting the displaced contact plug with respect to the plugs above it (relative to the FIGURE 13 disposition). Each of the pairs of leads associated with the contact plugs CP(2)-(8) are all branches of a single lead $s$, and the said branches comprise a single wiring assembly generally indicated by SWA. The previously described leads $x$ and $y$, which are associated with contact plug CP(1), are connected respectively to leads $w$ and $t$, and the leads $x$ and $y$ comprise an album wiring assembly generally indicated by AWA.

The previously described lead 307 (which is connected to key NSK(8) and therefore to each of the contacts NSC(1)-(7) via leads N1-N7) is also connected to plug P10. The previously described lead 309 (which is connected to leads N8 and NA and therefore to the contacts associated therewith and to lead LT and therefore to each of the contacts LSC(A)-(T) via the mutually interconnected leads LA-LT) is also connected to leads 306 and 308, which branch therefrom. Lead 306 is connected to plug P9, and lead 308 is connected to terminal T4, which serves as a singal terminal for selection of a record, as hereinafter described.

The rotary switch selection assembly RSSA also comprises a motor M which rotates a cam C and pointer arms FA and SA by means of the respective schematically indicated interconnectons 350 and 351. The rotatable pointer arm SA (which, as shown in FIGURE 13, is grounded) cooperates with the stationary numbered signal contacts NSC and lettered signal contacts LSC to form a rotary switch RS.

The rotary switch RS further comprises a stationary holding contact area HSA and a stationary single select light contact SSLC, hereinafter described, which cooperate with the rotatable pointer arm FA.

Normally opened switches WK, WG, WF, and WD and normally closed switch WE cooperate with the cam C, as indicated by the schematic interconnection designated by the reference numeral 352. The surface of the cam C is designed so that during a first initial phase of revolution the normally closed switch WE will be opened without closing any of the other normally opened switches, including the switch WD, and thereafter, as the revolution of the cam C continues, each of the normally opened switches WK, WG, WF, and WD will be closed. After the cam C completes one cycle of revolution, each of the switches WE-WK will be returned to the standby positions shown in FIGURE 13.

Motor M is connected between a lead 301 (which connects to lead 309 connected to terminal T2) and a lead 302. Normally opened switches WH and WJ are connected in series between motor M and the previously described lead 320, which connects to the contact plugs CP associated with the numbered signal buttons NSB. The switches WH and WJ are closed by the respective connections 600 and 601 simultaneously with the selection of given lettered and numbered signal buttons LSB and NSB, respectively. A lead 330 interconnects the motor M and the previously described holding contact area HCA. A lead 304 is connected to the previously described single select light contact SSLC, and a series combination of a single select light SSL and a series resistor R1 are connected between lead 304 and lead 301.

Similarly, an album select light ASL and its associated series resistor R2 are connected between lead 301 and plug P11; a pricing light PL and its associated series resistor R3 are connected between lead 301 and a grounded lead 305 (which connects to plug P1); and lights L1 and L2 and associated series resistor R4 are connected between lead 301 and grounded lead 305.

Switch WK is connected between grounded lead 305 and lead 321, which as previously described, connects to key NSK(1). Switch WG is connected between grounded lead 305 and lead 313 by means of a lead 311. Switch WF is connected to terminal T3 by a lead $u$ and to the album wiring system AWA by a lead $w$, which as previously described is connected to lead $x$ of album wiring assembly AWA. Switch WE is connected between motor M (by lead 302) and plug P7 by a lead 340, which is also connected to the previously mentioned lead $s$ of single wiring assembly SWA. Switch WD is connected between motor M (by lead 302) and grounded lead 305. A lead $z$ interconnects plug P12 and motor M (by lead 302), and the previously described lead $t$ is connected between lead $y$ of album wiring assembly AWA and plug P8.

The electrical operation of the described elements is as follows. FIGURES 12 and 13 show the relevant circuitry in a standby position. For purposes of description, it will be assumed that the multiple pricing unit 1 is set for the following pricing sequence: single selections, ten cents per selection or three selections for a quarter, and album selections, fifty cents per album. This arrangement is achieved by connecting coin switch jumper CSJ to plug 109 and single credit jumper SCJ to plug 110, such that single credit switch WM will close when two reference credit values are established, while single credit switch WN will remain open circuited, and by placing contact pins 101 and 102 in Album Credit Position XII (i.e., in the extreme right hand, relative to the FIGURE 9 disposition, holes of the sets 104 and 106 respectively), such that the respective album credit switches WP and WQ will close when twelve reference credits are established. Also, the subtract adjustment plate 72 is placed in its Position II (i.e., lowered, relative to its FIGURE 4 disposition) so that the subtract pawl 66 will normally subtract two reference credit values from the stacked credit wheel assembly 39 for each reciprocated stroke of the credit cancel slide 17. The quarter ratchet wheel 40Q and the dime ratchet wheel 40D will be adjusted relative to their respective quarter and dime pawls 48Q and 48D to the respective Positions VIQ and IID so that a quarter signal will establish six reference credit values and a dime signal will establish two reference credit values by appropriate rotation of the assembly 39.

When a dime is deposited under the assumed conditions, the dime solenoid 60D is momentarily energized since the deposited dime will momentarily close the dime coin switch DS, which defines a circuit from direct current source DCS through terminal T7, switch DS, plug P5, lead $e$, coin switch jumper CSJ, plug 109, lead $f$, and dime solenoid 60D, to ground. This energization of the dime solenoid 60D causes the crank member 88 to rotate with respect to the terminal plate 91 by an amount corresponding to two reference credit values, in the manner previously described. The indicated movement causes the switch WM to close, as the contact finger 94D engages the contactor area 95 (see FIGURE 12). Motor M is then energized by a circuit defined from voltage source V, through terminal T2, lead 300, lead 301, motor M, lead 302, closed switch WE, plug P7, lead *j*, single credit jumper SCJ, plug 110, closed switch WM, and contact area 95 to ground, via contact finger 94A and lead *d* which connects to grounded plug P1. When the motor M is thus energized, it rotates its associated cam C, as well as its associated pointer arms FA and SA, as indicated by the respective schematic connections 350 and 351. This initial movement of the cam C, as previously described, causes the switch WE to open (although the switch WD still remains open for the time being), so that the motor M is de-energized.

As the switch WE opens, the pointer arm FA contacts the single select light contactor SSLC, so that the single select light SSL is energized through the resistor R1 and lead 304. When the single select light SSL is thus energized, the user may select a single play by depressing any one of the lettered signal buttons LSB (A)–(T) and any one of the numbered signal buttons NSB(2)–(8), as for example the combination "T–7". Depression of the indicated buttons momentarily closes the respective switches WH and WJ, so that motor M is again energized through momentarily closed switches WH and WJ, and through single wiring assembly SWA, lead *s*, and plug P7 to ground via closed switch WM, as previously described. As the energized motor M then continues its rotation, switches WK, WG, WF, and WD are closed by the action of cam C, while switch WE remains open. Pointer arm FA also rotates and engages holding contact area HCA which provides a self-locking energization for motor M after the switches WH and WJ open, until such time as switch WD closes so that motor M is energized through closed switch WD and lead 305 to ground. The pointer arm SA will then rotate through one complete revolution under the influence of connection 351 and will successively ground each of the numbered signal contacts and the lettered signal contacts NSC and LSC, respectively. As pointer arm SA approaches the last of the lettered signal contacts LSC, pointer arm FA again engages holding contact area HCA so as to self-lockingly energize motor M. The engagement of pointer arm FA with holding contact area HCA occurs prior to the completion of a cycle for cam C which open circuits switch WD so as to cut off the motor energization circuit. The completion of the one-cycle rotation of the motor M also actuates the drive motor 26 (by means not shown) so as to reciprocate the lever 24 which, as previously described, effects a reciprocable actuation of the credit cancel slide 17. Since the subtract adjustment plate 72 is placed in its Subtract Position E (i.e., elevated with respect to the FIGURE 4 disposition of the credit cancel slide 17), the subtract pawl 66 will effect a two reference credit value rotation of the stacked credit assembly 39 for each such reciprocable movement of the slide 17. Thus, each single selection played causes, in effect, a removal of two reference credit values of credit on the stacked credit assembly 39.

Further, by means of the described one-cycle revolution of motor M, rotary switch RS transmits signals for the selection of a record corresponding to the originally depressed buttons LSB and NSB, in the following manner. A first signal pulse circuit is defined from terminal T4 through lead 308, lead 306, plug P9, lead *m*, normally closed relay switch WS, lead *n*, plug P10, and lead 307 to the numbered signal keys NSK(1)–(8) and therefore to the leads N1–N7 and the numbered signal contacts NSC corresponding thereto. A second signal pulse circuit is defined from terminal T4 through lead 308 and lead 309 to leads N8 and NA and to leads LT–LA (and therefore to the contacts corresponding thereto). As previously described, selection of given lettered and numbered signal buttons LSB and NSB operates to disconnect certain predetermined contacts from the leads 307 and 309 and therefore from the said first and second signal pulse circuits. Thus, a signal can be developed at terminal T4 by means of a cycle of revolution of grounded pointer arm FA (which signal consists of a series of spaced grounding pulses in predetermined sequence), and this signal at T4 may be conventionally processed through an electromechanical stepping selector arrangement (not shown) which picks the selected record for play in the main phonograph unit. In the course of this selection arrangement, the switch WK serves an anti-cheating function since it insures that a partial depression of one of the numbered signal buttons NSB (i.e., an incomplete displacement of the corresponding one of the numbered signal keys NSK) will serve to ground lead 307 through the interconnected numbered signal keys NSK so as to render the stepping selector arrangement inoperative by virtue of the presence of a continuous, as opposed to an intermittent, grounding signal through closed switch WK.

The actual audio play at the remote phonograph unit is achieved as follows: The closing of switch WG by means of cam C completes a circuit energizing the audio relay AR from terminal T2, through the audio relay AR, lead 311, and closed switch WG to grounded lead 305. Once energized, the audio relay AR closes switches WA, WB, and WC. The audio relay AR is self-locking via closed switch WC, which connects through terminal T3 to ground. The closing of switch WA completes a circuit from terminal T6 through closed switch WA and through the left channel speaker system LCS, and correspondingly the closing of switch WB completes a circuit from terminal T5, through closed switch WB, and through the right channel speaker system RCS. Appropriate audio signals are transmitted to terminal T5 and T6 so that the selected record is transformed into stereophonic sound on the speaker systems LCS and RCS of the remote unit. The audio arrangement forms no part of the present invention as such and is described herein only for purposes of clarifying the operation of the multiple pricing unit itself.

It should be observed that lights L1 and L2 are constantly energized by a circuit defined from voltage source V, through terminal T2, lead 300, lead 301, resistor R4, and lamps L1 and L2 in series, to ground. Similarly, pricing light PL is constantly energized from the lead 301 through pricing light PL and resistor R3 to ground. Lamps L1 and L2 are utilized to illuminate the cabinet (not shown) of the remote phonograph unit, and pricing light PL is utilized to illuminate a pricing unit (not shown) which displays an appropriate tab indicating the desired pricing sequence.

It should be noted that the previously described operation for selecting and playing a single record is dependent upon the closing of the switch WN (FIGURE 12) by the deposit of a dime. The deposit of one nickel will move the crank member 88 relative to the terminal plate 91 by an amount corresponding to one reference credit value so that the switch WN will remain open circuited. The deposit of two nickels will however cause two successive movements of the crank member 88 of one reference credit value each, so that the switch WN will be likewise closed, and a single selection can be made for the deposited two nickels. When a quarter is deposited, however, the crank member 83 will move relative to the terminal plate 91 by an amount corresponding to six reference credit values (by virtue of the indicated disposition of the quarter ratchet wheel 40Q in its Position VIQ) so that three successive single selections may be obtained for a deposited quarter (each such selection being accompanied by a removal of two reference credit values by reciprocable actuation of the credit cancel slide 17).

Album pricing, under the assumed conditions, is achieved as follows. When a quarter is deposited, quarter solenoid 60Q is momentarily energized, since the deposited quarter will momentarily close quarter coin switch QS, which defines a circuit from direct current source DCS through switch QS, plug P6, lead *g*, and quarter solenoid 60Q to ground. This energization of quarter solenoid 60Q causes crank member 88 to rotate with respect to terminal plate 91 by an amount corresponding to six reference credit values, in the manner previously described. The deposit of a second quarter correspondingly causes crank member 88 to rotate with respect to terminal plate 91 by an additional amount corresponding to six reference credit values, or a total of twelve reference credit values for the two deposited quarters. The indicated movement of twelve reference credit values causes switches WP and WQ to close, as the contact pins 102 and 101 (in assumed Album Credit Positions XII) respectively engage contactor areas 95 and 96 (see FIGURE 12). Since the described twelve reference credit value movement also closes switch WN (which only requires a two reference credit value movement to close), motor M is energized so as to cause an initial movement of cam C, which opens switch WE and de-energizes motor M. At this point, the user could select, if so desired, a total of six single selections (corresponding to three single selections per quarter for the two deposited quarters), or, alternatively, the user may select an album in the following manner.

The album select light ASL is now illuminated, indicating that an album may be selected, by a circuit defined from voltage source V through terminal T2, lead 300, lead 301, album select light ASL, series resistor R2, plug P11, lead *l*, normally closed relay switch WR, lead *p*, contact pin 102, and closed switch WP to grounded contact area 95. The user may now select an album play by depressing any one of the lettered signal buttons LSB (A)–(T) in conjunction with the numbered signal button NSB(1), as for example the combination "B–1". Depression of the indicated buttons momentarily closes the respective switches WH and WJ, so that the motor M is again energized through the momentarily closed switches WH and WJ, and through lead 320, depressed contact plug CP(1), lead *y* of album wiring assembly AWA, lead *t*, plug P8, lead *k*, lead *p*, contact pin 102, and closed switch WP, to grounded contact area 95. As the energized motor M then continues its rotation, switches WK, WG, WF, and WD are closed by the action of cam C, while switch WE remains open in the same manner as described with reference to single selection play.

However, since the numbered signal button NSB(1) has been utilized, album subtract relay 76 is energized due to the closing of switch WF, as follows. A circuit is defined from voltage source V, through terminal T2, lead 300, plug P2, lead *n*, album subtract relay 76, lead *i*, plug P3, lead *u*, closed switch WF, lead *w*, lead *x*, depressed contact plug CP of the "1" number signal button NSB, lead 320, closed switches WJ and WH, and closed switch WD to grounded lead 305. As soon as relay 76 is thus energized, normally opened relay switch WT is closed and normally closed relay switches WR and WS are opened. Opening of relay switch WR open-circuits the previously described circuit for illuminating album select light ASL so that this light then goes out, indicating that an album may no longer be selected. Opening of relay switch WS open-circuits the previously described first signal pulse circuit, but this circuit is in effect unaltered since the now opened switch WS is shunted by contact area 96 which is connected to leads *q* and *r* respectively by contact finger 94*a* and by contact pin 101 (i.e., closed switch WQ). Closing of switch WT self-lockingly energizes subtract relay 76, since lead *i* is then grounded via closed switch W7, lead *o*, plug P12, lead *z*, closed switch WD, and lead 305 to ground. Also, as previously described, energization of relay 76 causes rotation of subtract pawl 66 to a full credit subtract position for rotation of crank member 88 into engagement with stud 90, whereby all reference credit values previously established in the multiple pricing unit 1 are erased.

It should be observed that the switch WQ performs an important anti-cheating function, in that an album selection can be made only when sufficient credit has been established in the multiple pricing unit 1 so as to effect a closure of the switch WQ. Thus, if a user were to initially select a single selection (e.g., in the described embodiment, selection "A–2") and were then to attempt to quickly push in album selection button NSB(1), which is connected to album wiring assembly AWA, the album select relay 76 would be energized and the switch WS associated therewith would be opened, thereby to open-circuit the previously described first signal pulse circuit, unless the switch WP (which is a parallel shunt across the switch WS) is closed by virtue of the establishment of sufficient reference credit values in the unit 1 for selection of an album play. The switch WQ in effect replaces the switch WS in the first signal pulse circuit only when album play may be selected, as indicated by the state of the switch WQ.

The previously described pricing sequence of single selections, ten cents per selection or three selections for a quarter, and album selections, fifty cents per album, is indicated in Table I, entitled Exemplary Multiple Pricing Variations. This table shows additional pricing sequences which are available with a multiple pricing unit produced in accordance with the subject invention in terms of variations predicated upon the United States' currency. Column A indicates the pricing sequence for single and for album selections; Column B indicates the Album Credit Position for the contact pins 101 and 102 (which, in the described embodiment, can be IV, V, VI, VIII, X, or XII); Column C indicates the position of the dime ratchet wheel 40D (which, in the described embodiment, can be IID, IIID, or IVD); Column D indicates the position of the quarter ratchet wheel 40Q (which, in the described embodiment, can be IIIQ, IVQ, VQ, or VIQ); Column E indicates the plug (either 110 or 111) to which the single credit jumper SCJ is connected; Column F indicates the plug (either 108 or 109) to which the coin switch jumper CSJ is connected; and Column G indicates the Subtract Position for the subtract adjustment plate 72 (which, in the described embodiment, can be either I or II).

As indicated in Table I, the variations between items 1, 2, and 5 on the one hand and items 3, 4, 6, and 7 on the other hand illustrate the degree of flexibility inherent in the subject multiple pricing unit 1. It will be observed that the coin switch jumper CSJ is shifted in the latter group to plug 108, which has the effect of open-circuiting lead *f* and therefore dime solenoid 60D, as shown in FIGURE 12. However, a dime signal evidenced by closure of the dime switch DS is fed through lead *e* and coin switch jumper CSJ to lead *c* for energization of nickel solenoid 60N. Thus, the dime solenoid 60D is not used in the indicated arrangements because a dime signal is transmitted to the nickel solenoid 60N so as to establish one reference credit value on the stacked credit wheel assembly 39 for a deposited dime. In actual practice, a unit so calibrated would be set to reject deposited nickels (as by conventional slug rejection means, not shown). Correspondingly, the single credit jumper SCJ is shifted to plug 111 so as to connect switch WN (instead of switch WM) to lead *j*. Since switch WN will close after one reference credit value of rotation between crank member 88 and terminal plate 91, it is apparent that the multiple pricing unit 1 has been recalibrated so that the basic reference credit value corresponds to ten cents, instead of to five cents as in the previous description.

While the invention has been described with reference to various exemplary pricing sequences with United States' currency, it should be understood that a multiple pricing unit produced in accordance with the subject invention is capable of displaying even other variations, as required. For example, for foreign currencies, the various elements could be dimensioned to yield a calibration corresponding to a desired sequence for two or for three coins having denominational ratios varying from the 1:2:5 ratio of nickels, dimes, and quarters in the United States' currency system. However, the flexibility inherent in the multiple pricing unit as described herein is usually sufficient for ready adaptation as is to foreign currencies. Also, it is possible to provide ratchet wheels corresponding to the wheels 40D and 40Q with alternate or with additional sets of teeth, to provide alternate or additional Album Credit Positions, to provide varying subtract adjustment positions, etc., in order to even further enhance the variations in pricing which may be achieved.

While the invention has been described with reference to its utilization in a coin-operated remote phonograph unit which cooperates with a main phonograph unit, it should be understood that the multiple pricing unit described herein may be utilized in a wide variety of other vending equipment environments in which a flexibility of pricing sequences is needed. It should further be understood that various changes, modifications, and alterations may be effected in the details of construction and arrangements of the various elements, without departing from the spirit and the scope of the instant invention, as defined in the appended claims.

means for releasing the escapement pawl means in response to a coin of a first denomination so that the interconnected ratchet wheels rotate from the given rest position by an amount corresponding to a reference credit value;

means for releasing the escapement pawl means in response to a coin of a second denomination so that the interconnected ratchet wheels rotate from the given rest position by an amount corresponding to a multiple of the reference credit value, the said multiple having one value for the said first position of the second ratchet teeth means and having another value for the said second position of the second ratchet teeth means;

credit signal means responsive to the extent of rotation of the interconnected ratchet teeth means for establishing credit; and credit subtract means responsive to actuation of the credit signal means for returning the interconnected ratchet teeth means to the said given rest position, whereby variations in the credit value established by a coin of the second denomination may be determined by the disposition of the second ratchet teeth means relative to the given rest position of the first ratchet teeth means.

*Table I—Exemplary multiple pricing variations*

| | (A) Pricing sequence | (B) Album credit position (contact pins 101 and 102) | Position of— (C) 40D (dime ratchet wheel) | (D) 40Q (quarter ratchet wheel) | Plug connected to— (E) SCJ (single credit jumper) | (F) CSJ (coin switch jumper) | (G) Subtact position (subtact adjustment plate 72) |
|---|---|---|---|---|---|---|---|
| 1 | Singles: {10¢ per selection; Quarter, 3 selections} Albums: 2 Quarters | XII | IID | VIQ | 110 | 109 | II. |
| 2 | Singles: {10¢ per selection; Quarter, 3 selections} Albums: 1 Quarter | VI | IID | VIQ | 110 | 109 | II. |
| 3 | Singles: {10¢ per selection; Quarter, 5 selections} Albums: 2 Quarters | X | Not used | VQ | 111 | 108 | I. |
| 4 | Singles: {10¢ per selection; Quarter, 5 selections} Albums: 1 Quarter | V | Not used | VQ | 111 | 108 | I. |
| 5 | Singles: {5¢ per selection; Quarter, 6 selections} Albums: 1 Quarter | VI | IID | VIQ | 111 | 109 | I. |
| 6 | Singles: {10¢ per selection; Quarter, 4 selections} Albums: 22 Quarters | VIII | Not used | IVQ | 111 | 108 | I. |
| 7 | Singles: {10¢ per selection; Quarter, 4 selections} Albums: 1 Quarter | IV | Not used | IVQ | 111 | 108 | I. |

What is claimed is:

1. A multiple pricing unit for signaling credit in coin-responsive equipment, which comprises:

a frame;

first ratchet teeth means mounted for rotation relative to the frame;

escapement pawl means normally positioning the first ratchet teeth means in a given rest position relative to the frame;

second ratchet teeth means;

means detachably interconnecting the first and the second ratchet teeth means so that the second ratchet teeth means may be positioned at a first or at second position relative to the given rest position of the first ratchet teeth means;

means urging rotation of the interconnected ratchet teeth means;

2. A multiple pricing unit for signaling credit in coin-responsive equipment, which comprises:

a frame;

a first ratchet wheel journaled for rotation with respect to the frame and having a set of ratchet teeth spaced to define a one tooth angular increment as a reference credit value;

a second ratchet wheel journaled for rotation with respect to the frame and having ratchet teeth spaced in at least two sets, each tooth of a first set being spaced from the next successive clockwise tooth by an angular increment corresponding to a given multiple of a one tooth angular increment of the first ratchet wheel, and each tooth of a second set being spaced from the next successive clockwise tooth by an angular increment corresponding to another multiple of a one tooth angular increment of the first ratchet wheel;

first holding pawl means adapted for interengagement with the teeth of the first ratchet wheel in order to impede the rotation thereof;

second holding pawl means adapted for interengagement with the teeth of the second ratchet wheel in order to impede the rotation thereof;

means detachably interconnecting the first and second ratchet wheels so that the second ratchet wheel may be positioned with any one of its sets of ratchet teeth in alignment with the second holding pawl means for interengagement therewith;

locking pawl means normally retaining the interconnected ratchet wheels in a rest position relative to the frame;

spring means urging rotation of the interconnected ratchet wheels in a counterclockwise direction from the said rest position;

first solenoid actuated means responsive to a coin of a first denomination for releasing the locking pawl means and for engaging the first holding pawl means in the teeth of the first ratchet wheel so as to provide for an increment for counterclockwise rotation for the interconnected ratchet wheels corresponding to a one tooth angular increment of the first ratchet wheel;

second solenoid actuated means responsive to a coin of a second denomination for releasing the locking pawl means and for engaging the second holding pawl means in the teeth of the second ratchet wheel so as to provide for an increment of counterclockwise rotation for the interconnected ratchet wheels corresponding to a multiple of a one tooth angular increment of the first ratchet wheel, the said multiple being determined in accordance with the original disposition of the sets of ratchet teeth of the second ratchet wheel with respect to the second holding pawl means;

credit signal means responsive to the extent of rotation of the interconnected ratchet wheels in a counterclockwise direction for establishing credit; and credit subtract means responsive to actuation of the credit signal means for returning the interconnected ratchet wheels to the said rest position.

3. A multiple pricing unit as claimed in claim 2 in which the said second ratchet wheel is provided with three sets of ratchet teeth, each tooth of each set being spaced from the next successive clockwise tooth by an angular increment corresponding to a two times, three times, and four times multiple of a one tooth angular increment of the first ratchet wheel for the first, second, and third sets respectively.

4. A multiple pricing unit as claimed in claim 2 in which the means detachably interconnecting the first and the second ratchet wheels comprises a lug on one of the ratchet wheels and a series of apertures on the other of the ratchet wheels, the said lug being adapted for insertion in any one of the apertures.

5. A multiple pricing unit as claimed in claim 2 in which the said credit signal means comprises:

a terminal member affixed to the frame;

a rack member rotatably mounted on the frame and normally disposed in a rest position;

pinion means interconnected with the interconnected rachet wheels and intermeshing with the rack member;

electrical segment means on one of the members;

first electrical contact means on the other of the members and adapted to activate a first selection signal circuit through the electrical segment means when the rack member is rotated with respect to the terminal member by a first amount; and second electrical contact means on the other of the members and adapted to activate a second selection signal circuit through the electrical segment means when the rack member is rotated with respect to the terminal member by a second amount, whereby rotation of the interconnected ratchet wheels establishes credit by corresponding rotation of the rack member via the pinion means intermeshing therewith.

6. A multiple pricing unit as claimed in claim 5 and further comprising:

means for varying the said first amount by means of which the first electrical contact means is adapted to activate the first selection signal circuit through the electrical segment means; and means for varying the said second amount by means of which the second electrical contact means is adapted to activate the second selection signal circuit through the electrical segment means, whereby various pricing sequences may be selectively predetermined.

7. A multiple pricing unit as claimed in claim 5 and further comprising:

a relay having a normally closed relay switch associated therewith, the said relay switch being connected in series in both the first selection signal circuit and the second selection signal circuit;

anti-cheat second selection switch means connected in parallel with the relay switch and adapted to be closed when the rack member is rotated with respect to the terminal member by the said second amount; and means for energizing the relay whenever a second selection is made, whereby energization of the relay open-circuits the relay switch associated therewith so that the second selection signal circuit can be completed only when the said anti-cheat second selection switch means is closed.

8. A multiple pricing unit as claimed in claim 2 in which the said credit subtract means comprises:

a credit cancel slide mounted for reciprocable movement on the frame;

means for reciprocating the slide relative to the frame;

a subtract pawl pivotally mounted on the slide;

means normally positioning the subtract pawl for engagement with the teeth of the first ratchet wheel so as to effect a one tooth clockwise rotation thereof for each reciprocable stroke of the credit cancel slide;

means for repositioning the subtract pawl for engagement with the teeth of the first ratchet wheel so as to effect a two tooth clockwise rotation thereof for each reciprocable stroke of the credit cancel slide; and means for repositioning the subtract pawl so as to effect clockwise rotation of the first ratchet wheel to the said rest position for each reciprocable stroke of the credit cancel slide.

9. A multiple pricing unit as claimed in claim 2 and further comprising:

a third ratchet wheel journaled for rotation with respect to the frame and having ratchet teeth spaced in at least two sets, each tooth of a first set being spaced from the next successive clockwise tooth by an angular increment corresponding to a multiple of a one tooth angular increment of the first ratchet wheel, and each tooth of a second set being spaced from the next successive clockwise tooth by an angular increment corresponding to another multiple of a one tooth angular increment of the first ratchet wheel;

third holding pawl means adapted for interengagement with the teeth of the third ratchet wheel in order to impede the rotation thereof;

means detachably interconnecting the third ratchet wheel with the interconnected first and second ratchet wheels so that the third ratchet wheel may be positioned with any one of its sets of ratchet teeth in alignment with the third holding pawl means for interengagement therewith; and third solenoid actuated means responsive to a coin of a third denomination for releasing the locking pawl means and for engaging the third holding pawl means in the teeth of the third ratchet wheel so as to provide for an increment of counterclockwise rotation for the interconnected ratchet wheels corresponding to a multiple of a one tooth angular increment of the first ratchet wheel, the said multiple being determined in accordance with the original disposition of the sets of ratchet teeth of the third ratchet wheel with respect to the third holding pawl means.

10. A multiple pricing unit as claimed in claim 9 in which the third ratchet wheel is provided with four sets of teeth, each tooth of each set being spaced from the next successive clockwise tooth by an angular increment corresponding to a three times, four times, five times, and six times multiple of a one tooth angular increment of the first ratchet wheel for the first, second, third, and fourth sets of ratchet teeth respectively.

11. A stacked multiple pricing assembly for use in coin-responsive equipment, which comprises:

a shaft;

a first ratchet wheel journaled for rotation on the shaft and having thirty-six equally spaced ratchet teeth;

a second ratchet wheel journaled for rotation on the shaft and having thirteen ratchet teeth spaced in three sets, comprising: a first set of six teeth, each tooth of which is spaced from the next successive clockwise tooth by an angular increment corresponding to a two tooth angular increment of the first ratchet wheel; a second set of four teeth, each tooth of which is spaced from the next successive clockwise tooth by an angular increment corresponding to a three tooth angular increment of the first ratchet wheel; and a third set of three teeth, each tooth of which is spaced from the next successive clockwise tooth by an angular increment corresponding to a four tooth angular increment of the first ratchet wheel;

a third ratchet wheel journaled for rotation on the shaft and having eight ratchet teeth spaced in four sets of two teeth each, each tooth of each set being spaced from the next successive clockwise tooth by angular increments corresponding to three, four, five, and six tooth increments respectively of the first ratchet wheel;

a first series of apertures in the first ratchet wheel and a second series of apertures in the second ratchet wheel;

a lug extending from the second ratchet wheel and adapted for insertion in any one of the apertures of the first ratchet wheel and a lug extending from the third ratchet wheel and adapted for insertion in any one of the apertures of the second ratchet wheel; and spring means mounting the first, second, and third ratchet wheels in stacked co-axial alignment on the shaft with the lug of the second ratchet wheel being received in a given one of the apertures of the first ratchet wheel and the lug of the third ratchet wheel being received in a given one of the apertures of the second ratchet wheel, whereby either of the second and third ratchet wheels may be positioned at various angular orientations relative to the first ratchet wheel by axial displacement of either of the second and third ratchet wheels away from the first ratchet wheel, by rotation of the displaced ratchet wheel so as to position its extending lug into alignment with a desired aperture, and by axial replacement of the displaced ratchet wheel back toward the first ratchet wheel so as to interlock all three ratchet wheels.

12. Multiple pricing circuitry means for signaling credit in coin-responsive equipment adapted to dispense first and second types of selections, which comprises:

a stationary member;

a contact member mounted for movement with respect to the stationary member;

means for providing relative movement between the members in accordance with the amount of credit established by the deposit of coins in the vending equipment;

electrical segment means on one of the members;

first electrical contact means on the other of the members and adapted to activate a first credit signal circuit for the said first type of selection through the electrical segment means when contact is established between the first electrical contact means and the electrical segment means in response to a predetermined first amount of relative movement between the members; and second electrical contact means on the other of the members and adapted to activate a second credit signal circuit for the said second type of selection through the electrical segment means when contact is established between the second electrical contact means and the electrical segment means in response to a predetermined second amount of relative movement between the members, whereby the said first amount of relative movement between the members establishes credit sufficient for activation of the first credit signal circuit and the said second amount of relative movement between the members establishes credit sufficient for activation of the second credit signal circuit, such that the coin-responsive equipment may selectively dispense either first or second types of selections in accordance with the amount of credit established therein.

13. Multiple pricing circuitry means as claimed in claim 12 and further comprising:

means for varying the said predetermined first amount by means of which the first electrical contact means is adapted to activate the first selection credit signal circuit through the electrical segment means; and means for varying the said pretermined second amount by means of which the second electrical contact means is adapted to activate the second selection credit signal circuit through the electrical segment means, whereby various pricing sequences may be selectively predetermined.

14. Multiple pricing circuitry means for signaling credit in coin-responsive equipment adapted to dispense first and second types of selections, which comprises:

a stationary member;

a contact member mounted for movement with respect to the stationary member;

means for providing relative movement between the members in accordance with the amount of credit established by the deposit of coins in the vending equipment;

first switch means responsive to a given amount of relative movement between the members for activating a first selection circuit;

second switch means responsive to a greater amount of relative movement between the members for activating a second selection circuit;

a relay having a normally closed relay switch associated therewith, the said relay switch being connected in series in both the first and the second selection circuits;

third switch means closed in response to the said greater amount of relative movement between the members and connected in parallel with the said relay switch; and means for energizing the relay whenever a second selection is made, whereby energization of the relay open-circuits the relay switch associated therewith so that the second selection circuit can be completed only when the said third switch means is closed.

15. Multiple pricing circuitry means for signaling credit in coin-responsive equipment adapted to dispense first and second types of selections, which comprises:

a stationary member;

a contact member mounted for movement with respect to the stationary member;

means for providing relative movement between the members in accordance with the amount of credit established by the deposit of coins in the vending equipment;

first switch means responsive to a given amount of relative movement between the members for activating a first selection circuit;

means for varying the said given amount of relative movement between the members to which the first switch means are responsive;

second switch means responsive to a greater amount of relative movement between the members for activating a second selection circuit;

third switch means responsive to the said greater amount of relative movement between the members;

means for varying the said greater amount of relative movement between the members to which the second and the third switch means are respectively responsive;

a relay having a normally closed relay switch associated therewith, the said relay switch being connected in series in both the first and the second selection circuits;

means connecting the said third switch means in parallel with the said relay switch; and means for energizing the relay whenever a second selection is made, whereby a first but not a second selection may be made upon achievement of the said given amount of relative movement between the members and either a first or a second selection may be made upon achievement of the said greater amount of relative movement between the members.

16. A stacked multiple pricing assembly for use in coin-responsive equipment, which comprises:

a frame;

a first ratchet wheel journaled for rotation with respect to the frame and having a set of ratchet teeth spaced to define a one tooth angular increment as a reference credit value;

a second ratchet wheel journaled for rotation with respect to the frame and having at least two sets of ratchet teeth, each tooth of each set of the second ratchet wheel being spaced from a next adjacent tooth by an angular increment that defines a multiple of the reference credit value, said angular increment and therefore said multiple differing for each set of the second ratchet wheel; and means for detachably interlocking the ratchet wheels in axial alignment at any one of several angular orientations.

17. A stacked multiple pricing assembly for use in coin-responsive equipment, which comprises:

a frame;

a first ratchet wheel journaled for rotation with respect to the frame and having a set of ratchet teeth spaced to define a one tooth angular increment as a reference credit value;

a second ratchet wheel journaled for rotation with respect to the frame and having at least two sets of ratchet teeth, each tooth of each set of the second ratchet wheel being spaced from a next adjacent tooth by an angular increment that defines a multiple of the reference credit value, said angular increment and therefore said multiple differing for each set of the second ratchet wheel;

a third ratchet wheel journaled for rotation with respect to the frame and having at least two sets of ratchet teeth, each tooth of each set of the third ratchet wheel being spaced from a next adjacent tooth by an angular increment that defines a multiple of the reference credit value, said angular increment and therefore said multiple differing for each set of the third ratchet wheel; and means for detachably interlocking each of the second and third ratchet wheels in axial alignment with the first ratchet wheel at any one of several relative angular orientations.

18. A stacked multiple pricing assembly for use in coin-responsive equipment, which comprises:

a frame;

a first ratchet wheel journaled for rotation with respect to the frame and having a set of ratchet teeth spaced to define a one tooth angular increment as a reference credit value;

a second ratchet wheel journaled for rotation with respect to the frame and having three sets of ratchet teeth, each tooth of each set of the second ratchet wheel being spaced from a next adjacent tooth by an angular increment that defines a multiple of the reference credit value, said angular increment and therefore said multiple defining two, three, and four times the reference credit value for the respective three sets of the second ratchet wheel;

a third ratchet wheel journaled for rotation with respect to the frame and having four sets of ratchet teeth, each tooth of each set of the third ratchet wheel being spaced from a next adjacent tooth by an angular increment that defines a multiple of the reference credit value, said angular increment and therefore said multiple defining three, four, five, and six times the reference credit value for the respective four sets of the third ratchet wheel;

means for detachably interlocking the second ratchet wheel in axial alignment with the first ratchet wheel at any one of several relative angular orientations; and means for detachably interlocking the third ratchet wheel in axial alignment with the second ratchet wheel at any one of several relative angular orientations.

19. An assembly as claimed in claim 18 wherein the means for detachably interlocking the second ratchet wheel and the first ratchet wheel comprises a first series of apertures in one of the first and second ratchet wheels and a lug extending from the other of the first and second ratchet wheels for insertion in a given one of the apertures of the first series and wherein the means for detachably interlocking the third ratchet wheel and the second ratchet wheel comprises a second series of apertures in one of the second and third ratchet wheels and a lug extending from the other of the second and third ratchet wheels for insertion in a given one of the apertures of the second series.

20. A stacked multiple pricing assembly for use in coin-responsive equipment, which comprises:

a frame;

a first ratchet wheel journaled for rotation with respect to the frame and having a set of ratchet teeth spaced to define a one tooth angular increment as a reference credit value;

a second ratchet wheel journaled for rotation with respect to the frame and having ratchet teeth spaced in at least two sets wherein each tooth of each set is spaced from the next successive clockwise tooth by an angular increment corresponding to a multiple of the one tooth angular increment of the first ratchet wheel;

a series of apertures in one of the ratchet wheels;

a lug extending from the other ratchet wheel and adapted for insertion in any one of the apertures; and means mounting the ratchet wheels in stacked co-axial alignment on the shaft with the lug being received in a given one of the apertures such that the ratchet wheels may be positioned at any one of several relative angular orientations by appropriate interconnection of the lug and of one of the apertures.

References Cited by the Examiner

UNITED STATES PATENTS

| | | | |
|---|---|---|---|
| 2,613,791 | 10/52 | Triman | 194—9 |
| 2,659,471 | 11/53 | Johnston | 194—.02 |
| 2,901,078 | 8/59 | Hamilton. | |
| 2,972,400 | 2/61 | Gabrielsen | 194—9 X |

SAMUEL F. COLEMAN, *Primary Examiner.*

ERNEST A. FALLER, Jr., *Examiner.*